(12) United States Patent
Wippermann et al.

(10) Patent No.: US 11,330,161 B2
(45) Date of Patent: May 10, 2022

(54) DEVICE COMPRISING A MULTI-APERTURE IMAGING DEVICE FOR ACCUMULATING IMAGE INFORMATION

(71) Applicant: Fraunhofer-Gesellschaft zur Förderung der angewandten Forschung e.V., Munich (DE)

(72) Inventors: Frank Wippermann, Jena (DE); Andreas Brückner, Jena (DE); Jacques Duparré, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/351,544

(22) Filed: Jun. 18, 2021

(65) Prior Publication Data
US 2021/0314471 A1    Oct. 7, 2021

Related U.S. Application Data

(63) Continuation of application No. PCT/EP2019/086328, filed on Dec. 19, 2019.

(30) Foreign Application Priority Data

Dec. 21, 2018  (DE) .......................... 102018222861.2

(51) Int. Cl.
*H04N 5/225* (2006.01)
*H04N 5/262* (2006.01)

(52) U.S. Cl.
CPC ......... *H04N 5/2258* (2013.01); *H04N 5/2254* (2013.01); *H04N 5/2259* (2013.01); *H04N 5/2621* (2013.01)

(58) Field of Classification Search
CPC .................................................. H04N 5/2621
See application file for complete search history.

(56) References Cited

U.S. PATENT DOCUMENTS

2004/0239670 A1    12/2004  Marks
2010/0053212 A1*    3/2010  Kang ............... H04N 21/41407
                                            345/629
(Continued)

FOREIGN PATENT DOCUMENTS

DE    11 2014 005 165 T5    7/2016
DE    10 2015 215 840 A1    2/2017
(Continued)

OTHER PUBLICATIONS

Anonymous, "Smart Front Back Dual Camera—Android Apps on Google Play", May 6, 2016, XP055673882, https://web.archive.org/web/20160506101444/https://play.google.com/store/apps/details?id=com.vkrun.double_camera.
(Continued)

*Primary Examiner* — Gary C Vieaux
(74) *Attorney, Agent, or Firm* — Novick, Kim & Lee, PLLC; Jae Youn Kim; Jihun Kim

(57) ABSTRACT

A device includes a multi-aperture imaging device having an image sensor; an array of adjacently arranged optical channels, and a beam deflector for deflecting a beam path of the optical channels, wherein a relative position of the beam deflector is switchable between first and second positions so that in the first and second positions, the beam path is deflected towards first and second total fields of view, respectively. The device further includes controller adapted to control the beam deflector to move to the first and second positions to obtain imaging information of the first and second total fields of view, respectively, from the image sensor; and to insert a portion of the first imaging information into the second imaging information so as to obtain
(Continued)

accumulated image information that in parts represents the first total field of view and in parts represents the second total field of view.

17 Claims, 16 Drawing Sheets

(56) References Cited

U.S. PATENT DOCUMENTS

| | | | |
|---|---|---|---|
| 2016/0057363 A1* | 2/2016 | Posa | H04N 5/23216 |
| | | | 348/239 |
| 2016/0198097 A1* | 7/2016 | Yewdall | H04N 5/272 |
| | | | 348/659 |
| 2016/0255330 A1 | 9/2016 | Wippermann et al. | |
| 2016/0295087 A1* | 10/2016 | Oberdorster | H04N 5/2258 |
| 2016/0366392 A1* | 12/2016 | Raghoebardajal | H04N 13/161 |
| 2017/0118388 A1 | 4/2017 | Wippermann et al. | |
| 2017/0264825 A1 | 9/2017 | Wippermann et al. | |
| 2017/0287192 A1* | 10/2017 | Jeong | H04N 1/32128 |
| 2018/0035031 A1 | 2/2018 | Chang et al. | |
| 2018/0172945 A1 | 6/2018 | Wippermann et al. | |
| 2018/0176437 A1 | 6/2018 | Wippermann et al. | |
| 2018/0176471 A1 | 6/2018 | Wippermann et al. | |
| 2018/0176472 A1 | 6/2018 | Wippermann et al. | |
| 2018/0176473 A1 | 6/2018 | Wippermann et al. | |
| 2018/0184068 A1 | 6/2018 | Wippermann | |
| 2018/0198963 A1 | 7/2018 | Wippermann et al. | |
| 2018/0241920 A1 | 8/2018 | Wippermann et al. | |
| 2018/0324334 A1* | 11/2018 | Wippermann | H04N 5/2253 |
| 2019/0011809 A1 | 1/2019 | Wippermann et al. | |
| 2019/0068950 A1 | 2/2019 | Wippermann et al. | |
| 2020/0029023 A1 | 1/2020 | Wippermann et al. | |

FOREIGN PATENT DOCUMENTS

| | | |
|---|---|---|
| DE | 10 2016 204 148 A1 | 9/2017 |
| DE | 10 2016 208 210 A1 | 11/2017 |
| DE | 10 2017 206 442 A1 | 10/2018 |
| WO | 2015/073570 A2 | 10/2018 |
| WO | 2008/060031 A1 | 1/2020 |

OTHER PUBLICATIONS

J. Ens et al., "An Investigation of Methods for Determining Depth from Focus", IEEE Transactions on Pattern Analysis and Machine Intelligence, IEEE Computer Society, USA, vol. 15, No. 2, Feb. 1, 1993, pp. 97-108, XP002398664.

* cited by examiner

DEVICE COMPRISING A MULTI-APERTURE IMAGING DEVICE FOR ACCUMULATING IMAGE INFORMATION

CROSS-REFERENCES TO RELATED APPLICATIONS

This application is a continuation of copending International Application No. PCT/EP2019/086328, filed Dec. 19, 2019, which is incorporated herein by reference in its entirety, and additionally claims priority from German Application No. DE 102018222861.2, filed Dec. 21, 2018, which is incorporated herein by reference in its entirety.

The present invention relates to multi-aperture imaging devices, in particular to a device comprising a multi-aperture imaging device. The device is configured to use the information contained within the multi-aperture imaging device to produce a depth map and/or to accumulate image information. The present invention also refers to extracting depth information from focus stacks with an array camera and/or a self-portrait against a modified background with an array camera.

BACKGROUND OF THE INVENTION

Multi-aperture imaging devices can image the object field by using multiple partial fields of view. There are concepts that use a beam deflection system, such as a mirror, to enable deflection of a viewing direction of the camera channels from the device plane into another direction of the overall system, for example approximately perpendicular thereto. In the case of applying a mobile phone, for example, this vertical direction can be in one direction of the user's face or in the direction of the environment in front of him/her and can essentially be achieved by using switchable hinged mirrors.

Devices for efficient image generation and/or devices for easy handling would be desirable.

SUMMARY

According to an embodiment, a device may have: a multi-aperture imaging device comprising: an image sensor; an array of adjacently arranged optical channels, each optical channel including optics for projecting at least a partial field of view of a total field of view on an image sensor area of the image sensor, a beam deflector for deflecting a beam path of said optical channels, wherein a relative location of the beam deflector is switchable between a first position and a second position, so that in the first position the beam path is deflected towards a first total field of view, and in the second position the beam path is deflected towards a second total field of view; and the device may further have: control means adapted to control the beam deflector to move to the first position to obtain first imaging information of the first total field of view from the image sensor; to control the beam deflector to move to the second position to obtain second imaging information of the second total field of view from the image sensor; and to insert a portion of said first imaging information into said second imaging information so as to obtain accumulated image information that in parts represents said first total field of view and in parts represents said second total field of view.

One finding of the present invention is that by capturing a sequence of images in a sequence of focal positions, the depth map can be created from one's own image information, so that disparity information is not important and the use of such information can possibly be dispensed with.

According to an embodiment of the first aspect, a device comprises a multi-aperture imaging device. The multi-aperture imaging device comprises an image sensor, an array of adjacently arranged optical channels, each optical channel comprising optics for projecting at least a partial field of view of a total field of view on an image sensor area of the image sensor. The multi-aperture imaging device comprises beam deflection means for deflecting a beam path of the optical channels and focusing means for setting ing a focal position of the multi-aperture imaging device. A control means of the device is adapted to control the focusing means and to receive image information from the image sensor. The control means is configured to set a sequence of focal positions in the multi-aperture imaging device so as to detect a corresponding sequence of image information of the total field of view, and to create a depth map for the detected total field of view from the sequence of image information. The advantage of this is that the depth map can be generated from the sequence of focal positions, so that even a single shot of the total field of view from one viewing direction can provide a sufficient amount of information for creating the depth map.

According to an embodiment of the first aspect, the control means is configured to capture a corresponding number of groups of partial images in the sequence of focal positions. Each partial image is associated with an imaged partial field of view so that each of the groups of partial images has a common focal position. The control means is configured to perform a comparison of local image sharpness information in the partial images and to create the depth map from this. This is made possible, for example, in that with a known focal position, which has been set by the control means for detecting the group of partial images, and by determining sharply imaged objects, that is to say objects which are in the respectively set focal position, information can be obtained about the fact that the respectively sharply imaged image areas have been captured at a distance from the multi-aperture imaging device which corresponds to the set focal position. By using several groups of partial images and therefore several focal positions, corresponding information can be generated for different objects and, thus, for the total field of view in order to achieve the depth map. This allows large-area or even complete mapping of the total field of view with regard to depth information.

According to an embodiment of the first aspect, the device is configured to control the focusing means such that the sequence of focal positions is distributed substantially equidistantly within the image space. This can be done by an equidistant arrangement that is as exact as possible, but also by taking into account a tolerance range of up to ±25%, ±15% or ±5%, wherein the sequence of focal positions is distributed between a minimum focal position and a maximum focal position of the sequence. Due to the equidistance in the image area, uniform precision of the depth map across different distances can be achieved.

According to an embodiment of the first aspect, the device is configured to generate a sequence of total images reproducing the total field of view on the basis of the sequence of image information, each total image based on a combination of partial images of the same focal position. This joining of partial images can be done while using the depth map in order to obtain a high image quality in the joined total image.

According to an embodiment of the first aspect, the device is configured to alter, on the basis of the depth map, a total image which renders the total field of view. When the depth map is known, different image manipulations can be carried out, for example subsequent focusing and/or defocusing of one or more image areas.

According to an embodiment of the first aspect, a first optical channel of the array is formed to image a first partial field of view of the total field of view, a second optical channel of the array is formed to image a second partial field of view of the total field of view. A third optical channel is configured to completely image the total field of view. This enables using additional imaging functionalities, for example with regard to a zoom range and/or an increase in resolution.

According to an embodiment of the first aspect, the focusing means has at least one actuator for setting the focal position. The focusing means is configured to be at least partially disposed between two planes spanned by sides of a cuboid, the sides of the cuboid being aligned in parallel with each other and with a line extension direction of the array and of part of the beam path of the optical channels between the image sensor and the beam deflector. The volume of the cuboid is minimal and yet designed to include the image sensor, array, and the beam deflector. This allows the multi-aperture imaging device to be designed with a small dimension along a depth direction normal to the planes.

According to an embodiment of the first aspect, the multi-aperture imaging device has a thickness direction that is arranged to be normal to the two planes. The actuator has a dimension parallel to the thickness direction. A proportion of at most 50% of the actuator's dimension is arranged, starting from an area between the two planes, in such a way that it extends beyond the two planes. Arranging the actuator in a circumference of at least 50% between the planes results in a thin configuration of the multi-aperture imaging device, which also allows a thin configuration of the device.

According to an embodiment of the first aspect, the focusing means comprises an actuator for providing a relative movement between optics of at least one of the optical channels and the image sensor. This allows easy setting of the focal position.

In accordance with an embodiment of the first aspect, the focusing means is adapted to perform the relative movement between the optics of one of the optical channels and the image sensor while performing a movement of the beam deflector that is simultaneous to the relative movement. This makes it possible to maintain the set optical influence by the beam deflector, for example with regard to a beam deflecting surface of the beam deflector, which is used in an unchanged size to deflect the beam path, which enables a small size of the beam deflector since it is possible to dispense with the provision of relatively large surfaces at an increased distance.

According to an embodiment of the first aspect, the focusing means is arranged in such a way that it protrudes by a maximum of 50% from the area between the planes of the cuboid. By arranging the entire focusing means in the area between the planes, including any mechanical components and the like, a very thin design of the multi-aperture imaging device and, thus, of the device is made possible.

According to an embodiment of the first aspect, at least one actuator of the focusing means is a piezoelectric bending actuator. This makes it possible to preserve the sequence of focal positions with a short time interval.

According to an embodiment of the first aspect, the focusing means comprises at least one actuator adapted to provide movement. The focusing means further comprises mechanical means for transmitting the movement to the array for setting the focal position. The actuator is arranged on a side of the image sensor which faces away from the array, and the mechanical means is arranged in such a way that a flux of force laterally passes the image sensor. Alternatively, the actuator is arranged on a side of the beam deflector that faces away from the array, and the mechanical means is arranged in such a way that a flux of force laterally passes the beam deflector. This allows the multi-aperture imaging device to be designed in such a way that the actuator is positioned, in the lateral direction, perpendicularly to the thickness direction without blocking the beam paths of the optical channels while enabling avoidance of the device being detected. When several actuators are used, embodiments provide for arranging all of the actuators on that side of the image sensor which faces away from the array, for arranging all of the actuators on that side of the beam deflector which faces away from the array, or for arranging a subset of the actuators on that side of the image sensor which faces away from the array, and for arranging a subset, which is disjoint therefrom, on that side of the beam deflector which faces away from the array.

According to an embodiment of the first aspect, a relative position of the beam deflector is switchable between a first position and a second position so that in the first position, the beam path is deflected towards a first total field of view, and in the second position, the beam path is deflected towards a second total field of view. The control means is adapted to direct the beam deflector to the first position to obtain imaging information of the first total field of view from the image sensor, wherein the control means is further adapted to direct the beam deflector to the second position to obtain imaging information of the second total field of view from the image sensor. The control means is further adapted to insert a portion of said first imaging information into said second imaging information to obtain accumulated image information which in parts represents said first total field of view and in parts represents said second total field of view. This allows easy handling of the device since complex repositioning of the multi-aperture imaging device, e.g. for taking a picture of oneself against a background, can be dispensed with. This is possible, in a particularly advantageous manner, due to the self-generated depth map.

A further finding of the present invention is that one has recognized that by combining image information of different total fields of view, so that in an accumulated image information, the first total field of view and the second total field of view are reproduced in parts, respectively, easy handling of the device can be obtained since, for example, elaborate positioning of the user and/or of the device can be dispensed with.

According to an embodiment of the second aspect, a device comprises a multi-aperture imaging device having an image sensor, an array of adjacently arranged optical channels, and a beam deflector. Each optical channel of the array comprises optics for projecting at least a partial field of view of a total field of view on an image sensor area of the image sensor. The beam deflector is configured to deflect a beam path of the optical channels, wherein a relative position of the beam deflector is switchable between a first position and a second position, so that in the first position, the beam path is deflected toward a first total field of view, and in the second position, the beam path is deflected toward a second total field of view. The device further comprises control means adapted to direct the beam deflector to the first position. Thus controlled, image information may be obtained from the control means which relates to the first total field of view projected on the image sensor. The control means is configured to direct the beam deflector to the second position to obtain imaging information of the second total field of view from the image sensor. An order of obtaining the imaging information of the first total field of view and of obtaining the imaging information of the second total field of view may be arbitrary. Said control means is configured to insert a portion of said first imaging information into said second imaging information to obtain accumulated image information which in parts represents said first total field of view and in parts represents said second total field of view. This allows combining image contents of different total fields of view, so that time-consuming positioning of the device and/or image objects can be dispensed with.

According to an embodiment of the second aspect, the first total field of view is arranged along a direction corresponding to a user direction of the device or corresponding to an oppositely arranged world direction of the device. This allows combining image content in the first total field of view with a total field of view different therefrom.

In addition, according to an advantageous embodiment of the second aspect, the second total field of view is arranged along a direction corresponding to the other one of the user direction and the world direction, so that the two total fields of view together capture the world direction and the user direction. In the accumulated image information, contents from the world direction and contents from the user direction can thus be combined with each other.

According to an embodiment of the second aspect, the control means is adapted to identify and segment, i.e. to separate, a person in the first image information, or to at least copy the image information relating to the person and to insert the image of the person into the second image information so as to obtain the accumulated image information. This allows inserting the image of the person in an image environment that is actually arranged along a different direction of the device.

According to an advantageous configuration of this, the device is configured to automatically identify the person and to automatically insert the image of the person into the second image information. This makes it possible to obtain a picture of oneself (selfie) against an actually different background. This avoids complex positioning of the device, the person and/or the background. It also enables compensating for the fact that the background is mirror inverted.

According to an embodiment of the second aspect, the device is adapted to identify and/or segment the part, such as a person or at least a part thereof, while using a depth map generated by the device from the first imaging information. The depth map can, for example, be created while using the first aspect or by other means. This enables easy implementation of the embodiment.

According to an embodiment of the second aspect, the device is adapted to create for the second image information a depth map having a plurality of depth planes and to insert the first image information in a predetermined depth plane of the second image information so as to obtain the accumulated image information. This enables integrating the first image information into the second image information in a manner that is correct, in terms of depth, with regard to the predefined or predetermined depth plane.

According to an advantageous embodiment of this, the predefined depth plane within a tolerance range of 10% is equal to a distance of the first total field of view from the device. This enables the accumulated image information to be obtained in such a way that the second total field of view is represented as if the first image information, or the portion thereof, had been arranged along the other direction of the device.

According to another advantageous embodiment of this, the predefined depth plane is based on a user input associated with the placement of the first image information. This makes it possible that the depth plane that is to be considered can be varied between different pictures taken and/or can be adapted to the user's selection, by means of a user's input.

According to an embodiment of the second aspect, the device is configured to scale the first image information so as to obtain scaled first image information, and to insert the scaled first image information into the second image information so as to obtain the accumulated image information. This makes it possible to insert the first image information into the second image information in such a way that a predefined perception is obtained in the accumulated image information, in particular with regard to the size of the first image information, which is advantageous in particular in combination with the adjustable depth plane into which the first image information is inserted, so that, in addition to the insertion which is correct in terms of depth, a representation which is correct in terms of size is also possible.

According to an embodiment of the second aspect, the device is configured to determine a distance of an object imaged in the first image information with respect to the device and to scale the first image information on the basis of a comparison of the determined distance with the predetermined depth plane in the second image information. This makes it possible to automatically take into account, by scaling, i.e. by adjusting the size, a distance of the first image information which is changed by the depth plane when inserting it into the second image information.

According to an embodiment in accordance with the second aspect, the device is configured to detect the first total field of view and the second total field of view within a time interval of at least 0.1 ms to at most 30 ms. The lower limit is optional. Such fast capturing of both total fields of view makes it possible to reduce or even avoid changes in the total fields of view caused by time.

According to an embodiment in accordance with the second aspect, the device is configured to receive the accumulated image information as a video data stream. For this purpose, the device may obtain a plurality of accumulated image information data for a plurality of sequential images of the first total field of view and/or the second total field of view and combine them into an image sequence as a video data stream.

Alternatively or additionally, in accordance with the second aspect, embodiments provide for the provision of the accumulated image information as a still image.

According to an embodiment in accordance with the second aspect, the first image information comprises the image of a user, and the second image information comprises a world view of the device. The control means is configured to segment an image of the user from the first image information, possibly on the basis of depth map information generated with the device, and to insert the image of the user into the world view. This makes it easy to obtain a selfie by using the device.

According to an embodiment in accordance with the second aspect, the device is configured to insert the image of the user into the world view in a manner that is correct in terms of depth. This enables the impression that the user is standing in front of the world view, without the need for time-consuming positioning.

According to an embodiment in accordance with the second aspect, the device is configured to capture, with different focal positions, a sequence of images of the first total field of view and/or the second total field of view, and to create from the sequence of images a depth map for the first total field of view and/or the second total field of view. This enables, in particular, combining the second image information with the first image information within a predefined depth plane and/or imaging that is correct in terms of depth; for this purpose, the advantages of the first aspect of the present invention can be exploited. This means that the first aspect can be combined with implementations of the second aspect and/or the second aspect can be combined with implementations of the first aspect. Particularly in combination, the two aspects result in advantageous designs, which will be discussed later.

BRIEF DESCRIPTION OF THE DRAWINGS

Embodiments of the present invention will be detailed subsequently referring to the appended drawings, in which:

FIG. 4b shows a schematic lateral sectional view of the device of FIG. 4a to illustrate the arrangement of the actuator between the planes of the cuboid that are described in relation to FIG. 3a;

DETAILED DESCRIPTION OF THE INVENTION

Figure 1A:
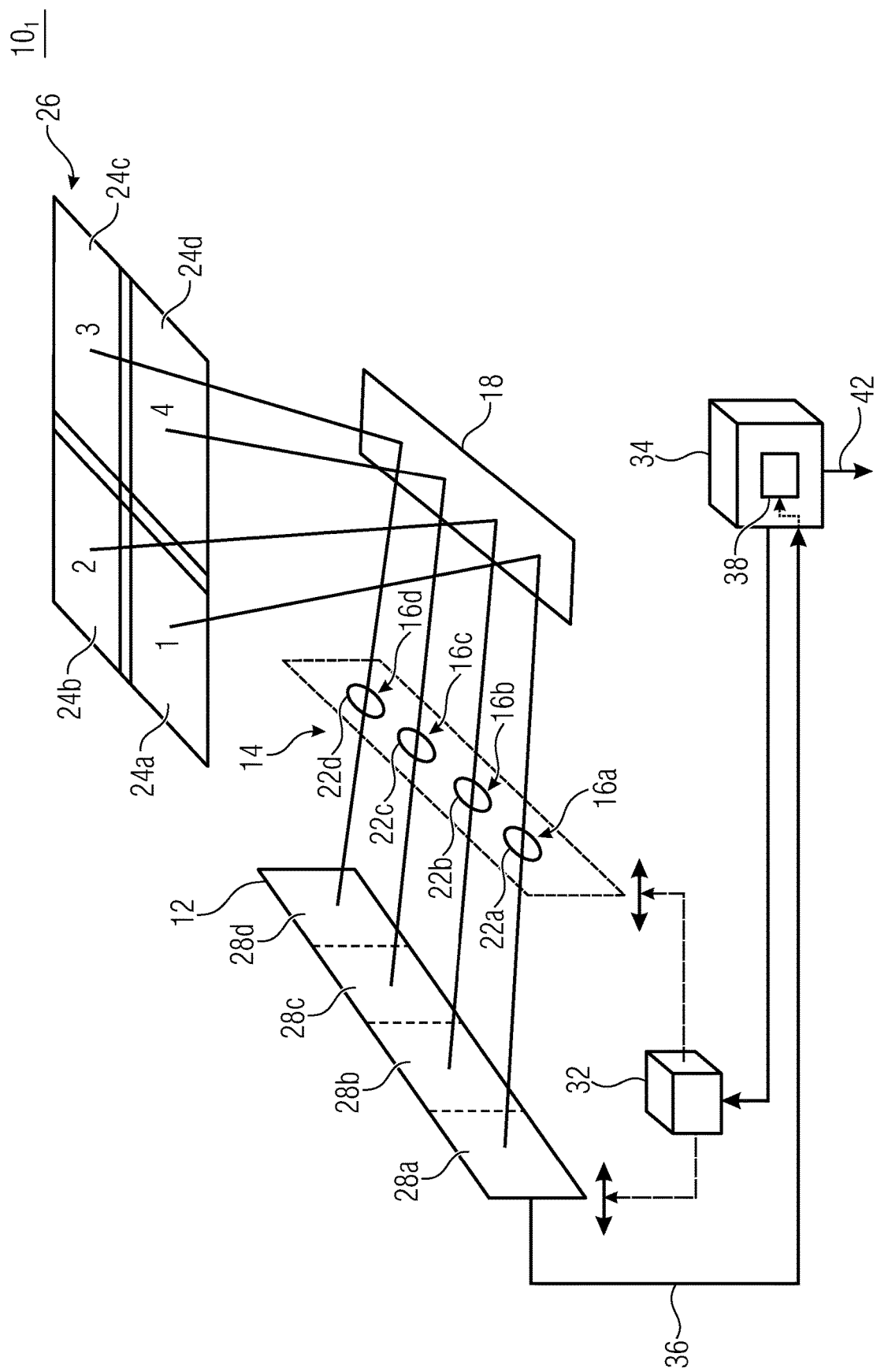
FIG. 1a shows a schematic perspective view of a device according to the first aspect.

Before the embodiments of the present invention will be explained in detail below with reference to the drawings, it shall be pointed out that elements, objects and/or structures in the different figures which are identical, identical in function or effect are provided with the same reference numeral, so that the description of these elements presented in different embodiments is interchangeable with each other or can be applied to each other.

FIG. 1a shows a schematic perspective view of a device $10_1$ according to the first aspect. The device $10_1$ comprises a multi-aperture imaging device comprising an image sensor 12 and an array 14 of adjacently arranged optical channels 16a-e. The multi-aperture imaging device further comprises a beam deflector 18 for deflecting a beam path of optical channels 16a-d. This allows the beam paths of the optical channels 16a-d to be deflected between a lateral course between the image sensor 12 by optics 22a-d of the array 14 and the beam deflector 18 toward a non-lateral course. Different optical channels 16a-d are deflected in such a way that each optical channel 16a-d projects a partial field of view 24a-d of a total field of view 26 on an image sensor area 28a-d of the image sensor 12. The partial fields of view 24a-d can be distributed in space in a one-dimensional or two-dimensional manner, or, on the basis of different focal lengths of the optics 22a-d, in a three-dimensional manner. For better comprehensibility, the total field of view 26 will be described below in such a way that the partial fields of view 24a-d have a two-dimensional distribution, wherein adjacent partial fields of view 24a-d can overlap each other. A total area of the partial fields of view results in the total field of view 26.

The multi-aperture imaging device comprises focusing means 32 for setting a focal position of the multi-aperture imaging device. This can be done by varying a relative location or position between the image sensor 12 and the array 14, wherein the focusing means 32 can be adapted to vary a position of the image sensor 12 and/or a position of the array 14 in order to obtain a variable relative position between the image sensor 12 and the array 14, so as to set the focal position of the multi-aperture imaging device.

Setting the relative position can be channel-specific or apply to groups of optical channels or to all channels. For example, single optics 22a-d may be moved, or a group of optics 22a-d or all optics 22a-d may be moved together. The same applies to the image sensor 12.

The device comprises control means 34 adapted to control the focusing means 32. In addition, the control means 34 is adapted to receive image information 36 from the image sensor 12. This could be, for example, the partial fields of view 24a-d projected on the image sensor areas 28a-d, or information or data corresponding to the projections. This does not preclude intermediate processing of the image information 36, for example with regard to filtering, smoothing or the like.

The control means 34 is configured to set a sequence of focal positions in the multi-aperture imaging device so as to detect a corresponding sequence of image information of the total field of view 26. The control means 34 is adapted to create a depth map 38 for the total field of view 26 from the sequence of image information. The depth map 38 can be provided via a corresponding signal. The control means 34 is capable of capturing different images of the same field of view 26 on the basis of the different focal positions obtained by different relative positions between the image sensor 12 and the array 14, and/or is capable of capturing differently focused partial images thereof in accordance with segmentation by the partial fields of view 24a-d.

Depth maps can be used for different purposes, for example for image processing, but also for image merging. Thus, the control means 34 may be adapted to connect individual images (single frames) obtained from the image sensor areas 28a to 28d while using the depth map 38 to obtain image information 42 representing the image of the total field of view 26, that is, a total image. Using a depth map is particularly advantageous for such methods of merging partial images, also known as stitching.

While using the depth map, the control means may be configured to assemble the partial images of a group of partial images to form a total image. This means that the depth map used for stitching can be generated from the very partial images to be stitched. For example, on the basis of the sequence of image information, a sequence of total images representing the total field of view can be generated. Each total image can be based on a combination of partial images with the same focal position. Alternatively or additionally, at least two, several or all total images from the sequence can be combined to obtain a total image with extended information, e.g. to create a Bokeh effect. Alternatively or additionally, the image can also be represented in such a way that the entire image is artificially sharp, i.e. a larger number of partial areas are in focus than is the case in the single frames, for example the entire image.

The device $10_1$ is configured to create the image of the total field of view as a mono image and to create the depth map 38 from the sequence of mono images. Although multiple scanning of the total field of view 26 is also possible, the device 10 can generate the depth map from one mere mono image, which can spare the need for additional pictures to be taken from different viewing directions, e.g. by using multiple pictures taken with the same device or by means of redundant arrangement of additional optical channels.

Figure 1B:
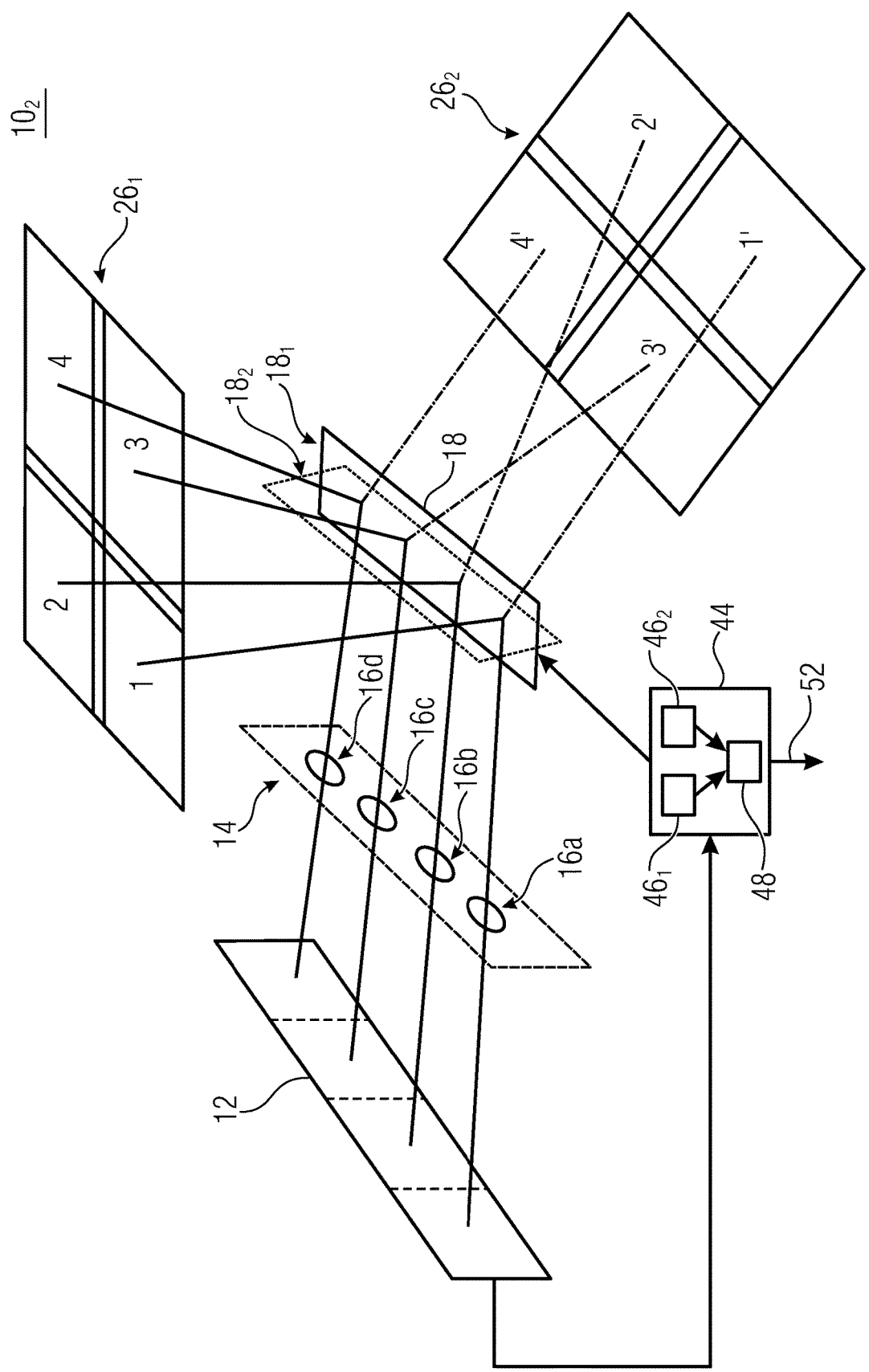
FIG. 1b shows a schematic perspective view of a device according to an embodiment of the second aspect.

FIG. 1b shows a schematic perspective view of a device $10_2$ according to an embodiment of the second aspect. Compared to the device $10_1$, the device $10_2$ has, instead of the control means 34, a control means 44 configured to direct the beam deflector to different positions $18_1$ and $18_2$. In the different positions $18_1$ and $18_2$, the beam deflector 18 has different relative positions, so that in the different positions or locations, image information of different total fields of view $26_1$ and $26_2$ is obtained since the beam paths of the optical channels 16a-d are deflected in different directions influenced by the different positions $18_1$ and $18_2$. Alternatively or in addition to the control means 34, the device $10_2$ comprises control means 44 configured to direct the beam deflector to the first position $18_1$ to obtain imaging information of the first total field of view $26_1$ from the image sensor 12. Before or after that, the control means 44 is adapted to direct the beam deflector 18 to the second position $18_2$ to obtain image information of the second total field of view $26_2$ from the image sensor 12. The total fields of view $26_1$ and $26_2$ may be disjoint. The control means 44 is adapted to insert a portion of the first image information $46_1$ into the second image information $46_2$ to obtain common or accumulated image information 48. The accumulated image information 48 may reproduce parts of the first total field of view $26_1$ and parts of the second total field of view $26_2$, which involves steps of image manipulation or processing. This means that the accumulated image information 48 is based, in some places, on an image of the total field of view $26_1$ and in other places on an image of the total field of view $26_2$.

The control means 44 may be adapted to provide a signal 52 containing or reproducing the accumulated image information 48. Optionally, the image information $46_1$ and/or $46_2$ can also be output by signal 52.

Figure 1C:
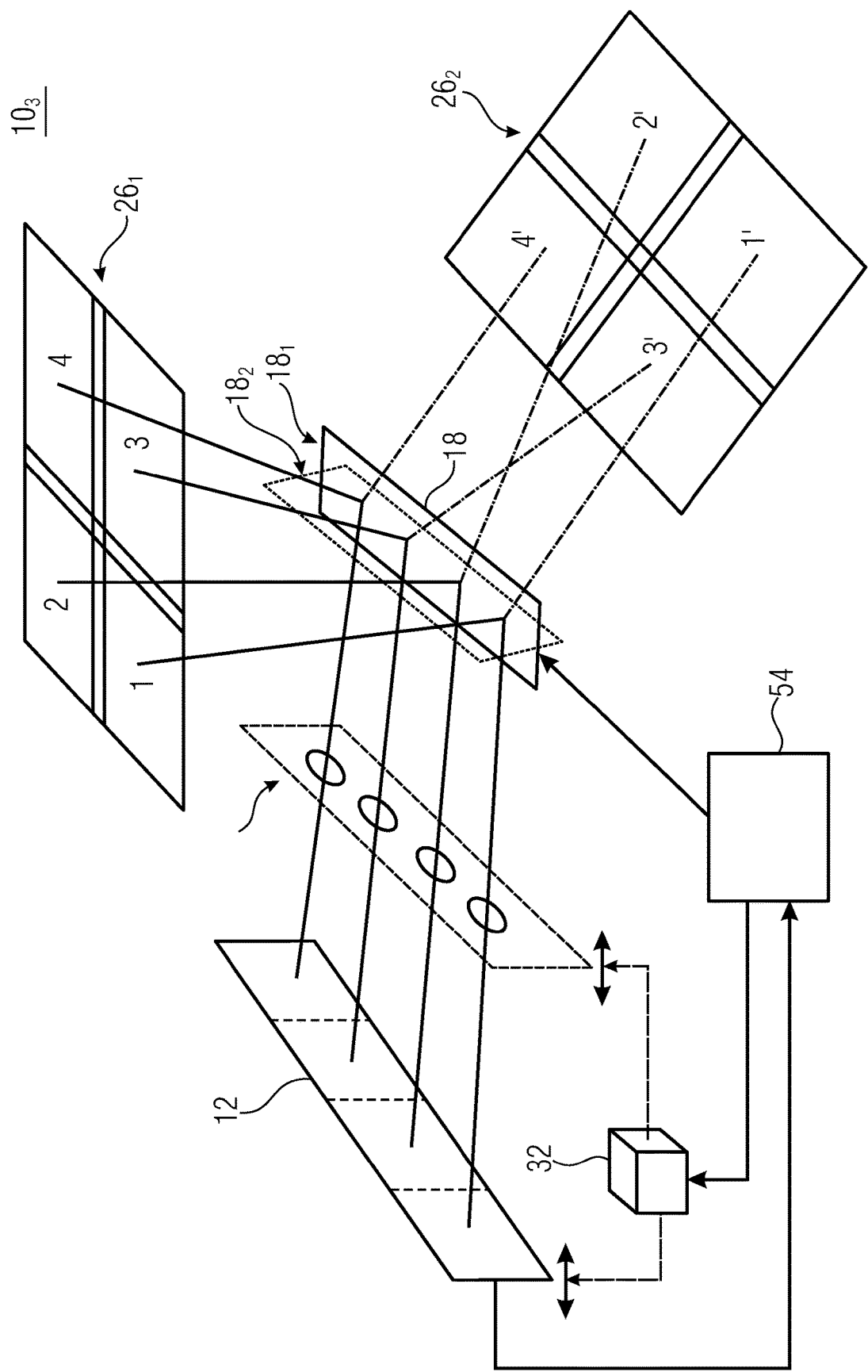
FIG. 1c shows a schematic perspective view of a device according to an embodiment, combining the first aspect and the second aspect.

FIG. 1c shows a schematic view of an device $10_3$ according to an embodiment which comprises, instead of the control means 34 of FIG. 1a and instead of the control means 44 of FIG. 1b, a control means 54 which combines the functionality of the control means 34 and of the control means 44 and is adapted to produce the depth map 38 on the basis of a variable focal position of the device $10_3$, and to provide the accumulated image information 48 of FIG. 1b.

Figure 2A:
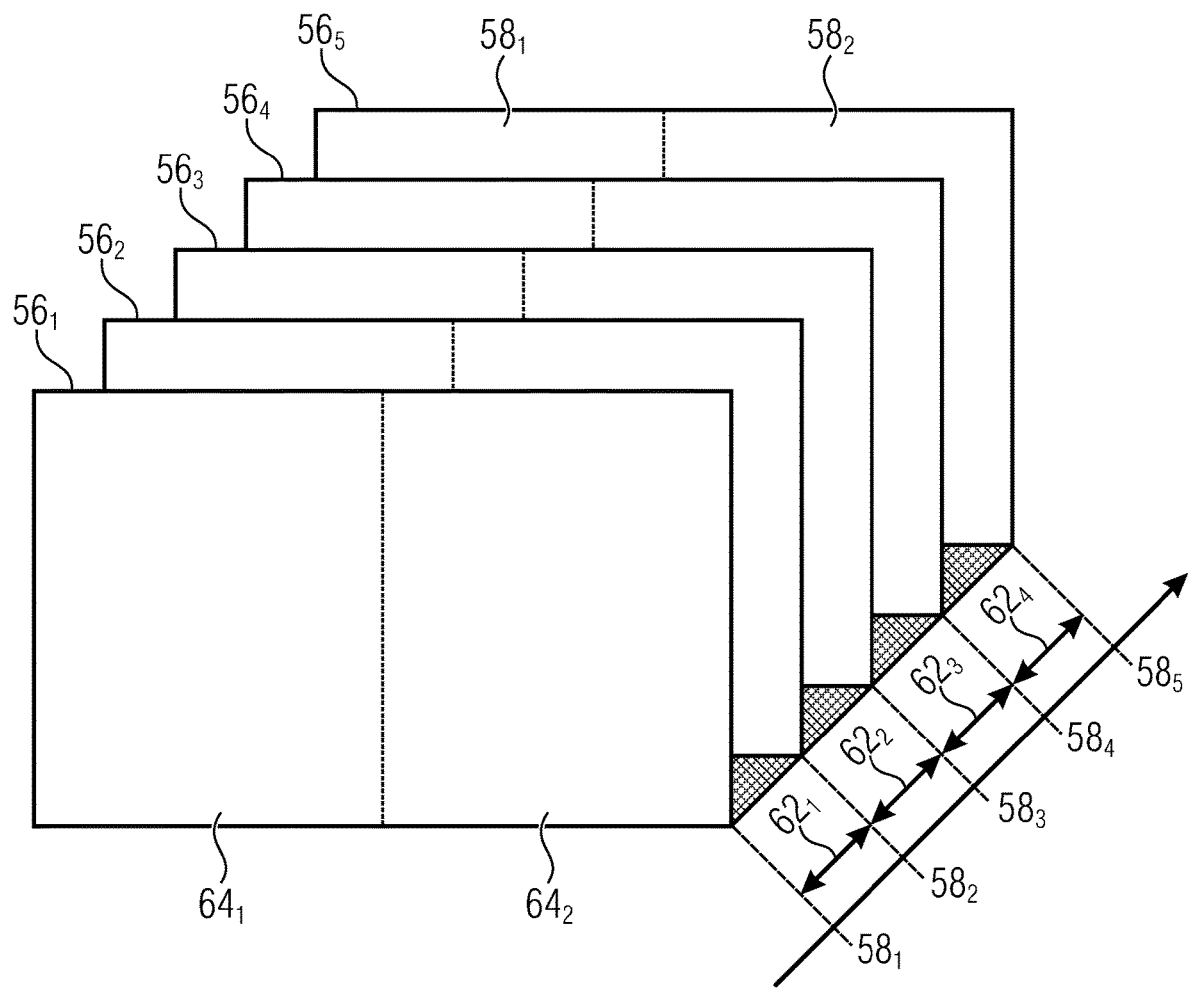
FIG. 2a shows a schematic view of different focal positions according to an embodiment, in which a device can be controlled according to the first aspect.

FIG. 2a shows a schematic view of different focal positions $56_1$ to $56_5$ which can be set in a device according to the first aspect, for example the device $10_1$, and the device $10_2$. The different focal positions $56_1$ to $56_5$ can be understood as positions or distances $58_1$ to $58_5$ in which objects in the captured field of view are projected on the image sensor 12 in a focused manner. A number of focal positions 56 can be arbitrary and be greater than 1.

Distances $62_1$ to $62_4$ between adjacent focal positions can refer to distances in the image space, where an implementation or transfer of the explanation to distances in the object space is also possible. However, the advantage of viewing the image space is that the properties of the multi-aperture imaging device are taken into account, especially with regard to a minimum or maximum object distance. Control means 34 and/or 54 may be adapted to control the multi-aperture imaging device to have two or more focal positions $56_1$ to $56_5$. In the respective focal position, single frames $64_1$ and $64_2$ can be captured in accordance with the number of partial fields of view 24 captured. On the basis of the knowledge of which of the focal positions $56_1$ to $56_5$ has been set to obtain the respective partial image $46_1$ and $46_2$, the control means can determine, by analyzing the image information in terms of which of the image parts are imaged sharply, the distance at which these sharply imaged objects are arranged with respect to the device. This information regarding the distance can be used for the depth map 38. This means that the control means can be configured to capture a corresponding number of groups of partial images in the sequence of focal positions $56_1$ to $56_5$, each partial image being associated with a partial field of view imaged. The group of partial images can therefore correspond to those partial images that represent the total field of view in the set focal position.

The control means may be configured to produce the depth map from a comparison of local image sharpness information in the partial images. The local sharpness information can indicate in which areas of the image objects are in focus, or are sharply imaged within a previously defined tolerance range. For example, a determination of the edge blurring function and a detection of the distances over which the edges extend can be used to determine whether a corresponding image area, a corresponding object or a part thereof is sharply imaged or is blurred on the image sensor. Furthermore, the sequential-image or line-blurring function can be used as a quality criterion for the sharpness of image content. Alternatively or additionally, any known optical sharpness metric, as well as the known Modulation Transfer Function (MTF), can be used. Alternatively or additionally, the sharpness of the same objects in adjacent images of the stack, association of the focus actuator position with the object distance via a calibrated lookup table and/or the direction of the through-focus scan can be used to obtain the depth information from adjacent images of the stack in a partly recursive manner and to avoid ambiguities. Knowing the set focal position which is uniquely correlated with an object distance which is imaged in focus, it is thus possible to infer from—the knowledge that the object is imaged in focus, at least within the predetermined tolerance range—a distance from the area of the image, of the object or the part thereof, which can be a basis for the depth map 38.

When using the depth map, the control means may be configured to assemble the partial images of a group of partial images into a total image. This means that the depth map used for stitching can be generated from the partial images to be stitched themselves.

The device may be configured to control the focusing means 32 so that the sequence of focal positions $56_1$ to $56_5$ is distributed equidistantly in the image space between a minimum focal position and a maximum focal position within a tolerance range of ±25%, ±15% or ±5%, advantageously as close to 0% as possible. To save time when setting a focal position, it makes sense, but is not necessary, to set the focal positions $56_1$ to $56_5$ sequentially at an increasing or decreasing distance. Rather, an order of the set focal positions $56_1$ to $56_5$ is arbitrary.

Figure 2B:
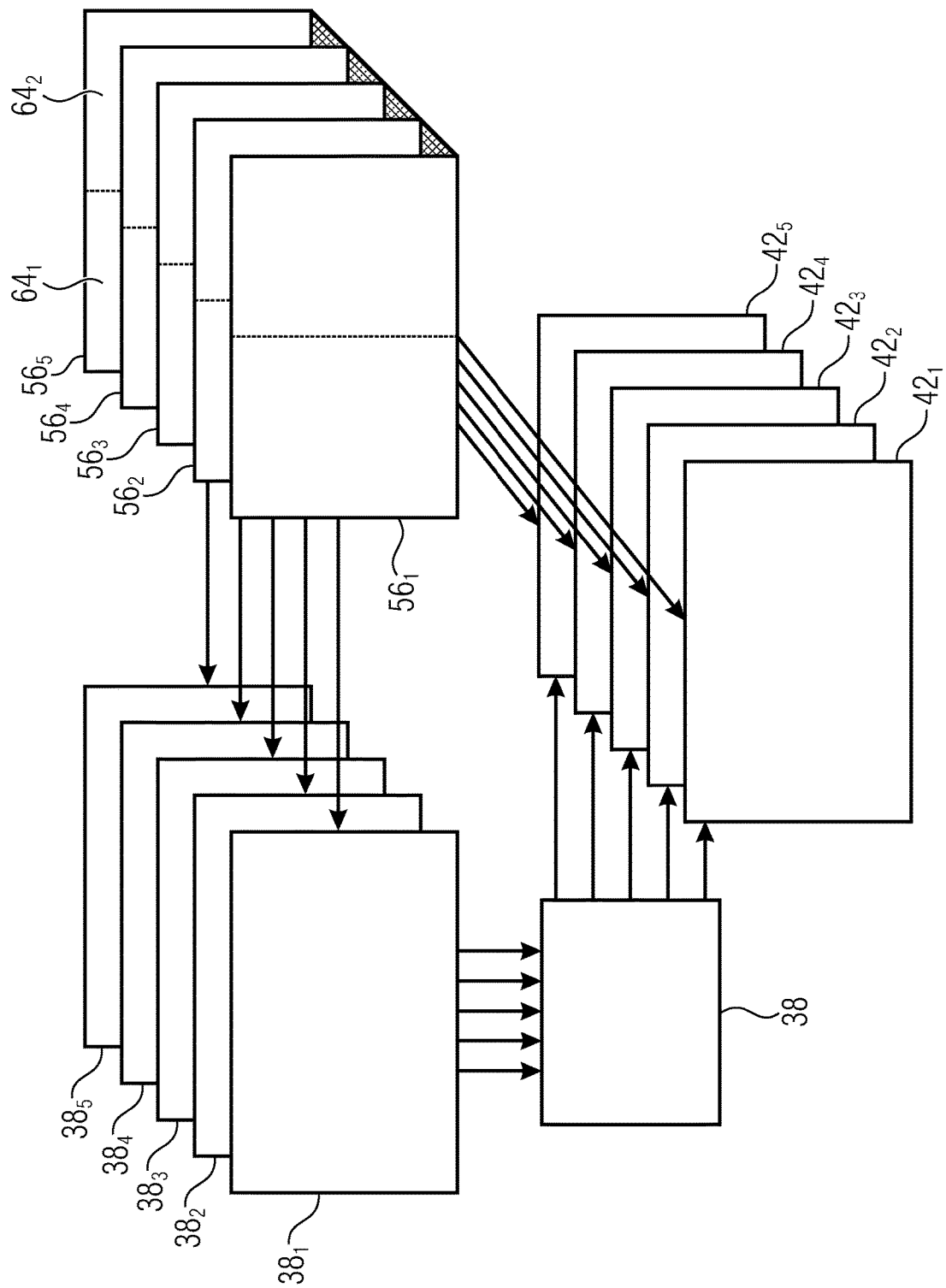
FIG. 2b shows a schematic representation of the utilization of a depth map generated from different focal positions according to an embodiment as well as its generation.

FIG. 2b shows a schematic representation of the use of the depth map 38 and its generation. The partial images $64_1$ and $64_2$ can each be used to obtain partial information $38_1$ to $38_5$ of the depth map 38 from the respective focal position $56_1$ to $56_5$ since the objects sharply represented in the single frames $64_1$ and $64_2$ can be precisely determined with respect to their distance. Between the focal positions $56_1$ and $56_5$, however, interpolation methods can also be used, so that sufficiently precise information can still be obtained for the depth map 38 even with slightly blurred objects.

The distance information contained in the partial information $38_1$ to $38_5$ may be combined by the control means to form the depth map 38. The depth map 38 can be used to combine the single frames $64_1$ and $64_2$ from the different focal positions $56_1$ to $56_5$ to form a corresponding number of total images $42_1$ to $42_5$.

Figure 3A:
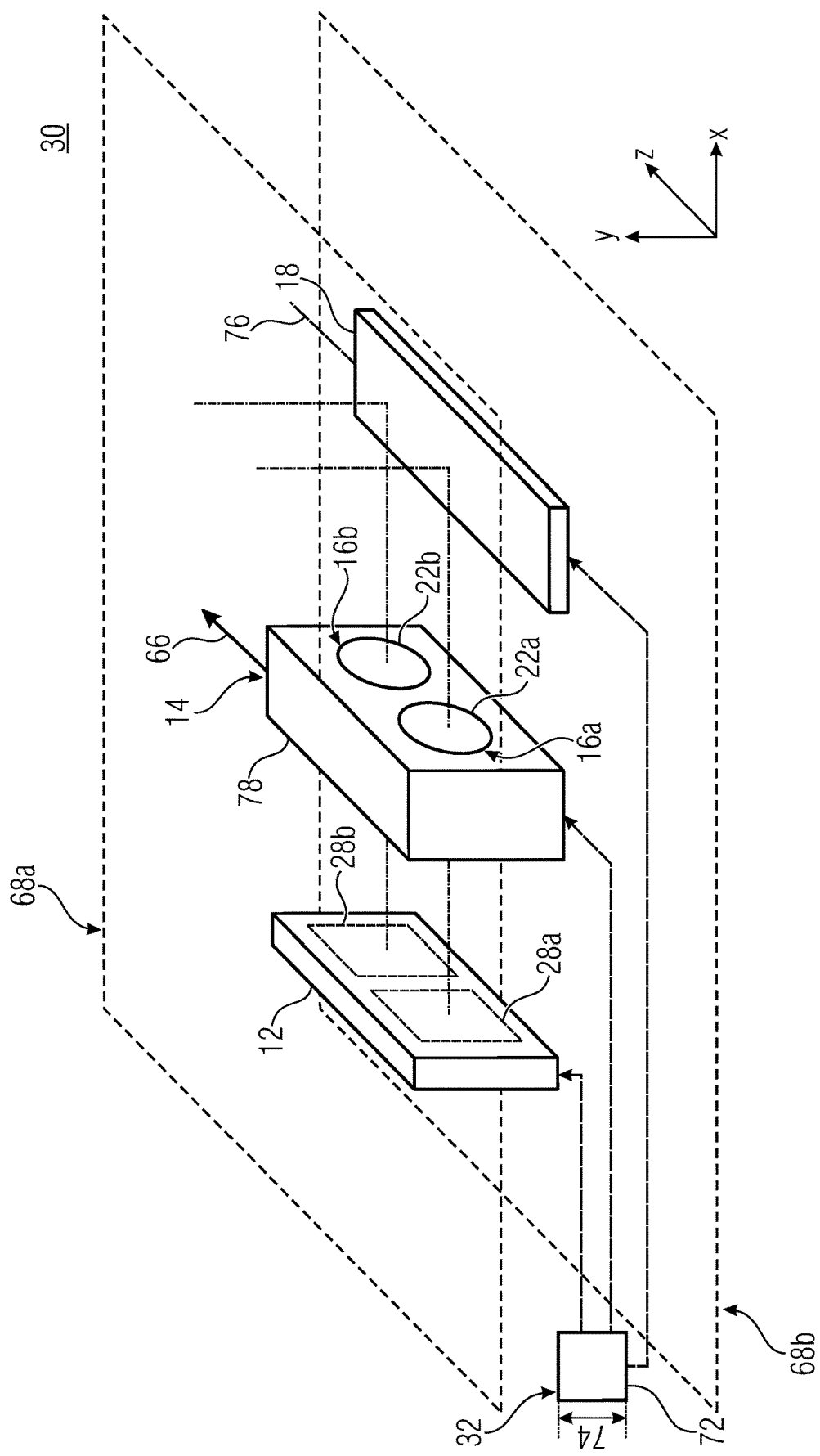
FIG. 3a shows a schematic perspective view of a device according to an embodiment in which an image sensor spans an array of optical channels, and a beam deflector spans a cuboid in space.

FIG. 3a shows a schematic perspective view of a device 30 according to a embodiment. The image sensor 12, the array 14 and the beam deflector 18 can span a cuboid within the room. The cuboid can also be understood as a virtual cuboid and can, for example, have a minimum volume and, in particular, a minimum vertical extension along a direction parallel to a thickness direction y that is parallel to a line extension direction 66. The line extension direction 66, for example, runs along a z direction and perpendicularly to an x direction, which is arranged parallel to a course of the beam paths between the image sensor 12 and the array 14. The directions x, y and z may span a Cartesian coordinate system. The minimum volume of the virtual cuboid, or the minimum vertical extension thereof, can be such that the virtual cuboid nevertheless comprises the image sensor 12, the array 14 and the beam deflector 18. The minimum volume can also be understood as describing a cuboid which is spanned by the arrangement and/or operational movement of the image sensor 12, the array 14 and/or the beam deflector 18. The line extension direction 66 can be arranged in such a way that the optical channels 16a and 16b are arranged next to each other, possibly parallel to each other, along the line extension direction 66. The line extension direction 66 can be fixedly arranged within the room.

The virtual cuboid may have two sides arranged opposite each other in parallel, parallel to the line extension direction 66 of array 14, and parallel to a portion of the beam path of the optical channels 16a and 16b between the image sensor 12 and the beam deflector 18. In a simplified manner, but without a restrictive effect, these can be, for example, a top side and a bottom side of the virtual cuboid. The two sides can span a first plane 68a and a second plane 68b. This means that both sides of the cuboid can be part of plane 68a or 68b, respectively. Further components of the multi-aperture imaging device may be arranged entirely, but at least partially, within the area between planes 68a and 68b, so that an installation space requirement of the multi-aperture imaging device along they direction, which is parallel to a surface normal of planes 68a and/or 68b, may be small, which is advantageous. A volume of the multi-aperture imaging device may have a small or minimal installation space between planes 68a and 68b. Along the lateral sides or extension directions of planes 68a and/or 68b, the installation space of the multi-aperture imaging device can be large or arbitrarily large. The volume of the virtual cuboid is influenced, for example, by an arrangement of the image sensor 12, the array 14 and the beam deflector 18, the arrangement of these components being such that, according to the embodiments described herein, the installation space of these components along the direction perpendicular to the planes and, thus, the distance of the planes 68a and 68b from each other becomes small or minimal. Compared to other arrangements of the components, the volume and/or distance of other sides of the virtual cuboid can be increased.

The device 30 comprises an actuator 72 for generating a relative movement between the image sensor 12, the single-line array 14 and the beam deflector 18. This may include, for example, a positioning movement of the beam deflector 18 to switch between the positions described in relation to FIG. 1b. Alternatively or additionally, the actuator 72 can be configured to execute the relative movement described in connection with FIG. 1a to change the relative position between the image sensor 12 and the array 14. The actuator 72 is arranged at least partially between the planes 68a and 68b. The actuator 72 may be adapted to move at least one of the image sensor 12, the single-line array 14 and the beam deflector 18, which may include rotational and/or translational movements along one or more directions. Examples of this are a channel-specific change of a relative position between image sensor areas 28 of a respective optical channel 16, of the optics 22 of the respective optical channel 16 and of the beam deflector 18 and/or of the corresponding segment or facet, respectively, and/or a channel-specific change of an optical property of the segment/facet relating to the deflection of the beam path of the respective optical channel. Alternatively or additionally, the actuator 72 may at least partially implement an autofocus and/or optical image stabilization.

The actuator 72 may be part of the focusing means 32 and may be adapted to provide a relative movement between at least one optics of at least one of optical channels 16a and 16b and the image sensor 12. The relative movement between the optics 22a and/or 22b and the image sensor 12 can be controlled by the focusing means 32 in such a way that the beam deflector 18 performs a simultaneous movement. When reducing a distance between the optics 22a and/or 22b and the image sensor, the distance between the beam deflector 18 and the image sensor 12 can be reduced accordingly, so that a relative distance between the array 14 and the optics 22a and/or 22b, respectively, and the beam deflector 18 is substantially constant. This enables the beam deflector 18 to be equipped with small beam deflecting surfaces since a beam cone growing due to a growing distance between the array 14 and the beam deflector 18 may be compensated for by maintaining the distance from the beam deflector 18.

The focusing means 32 and/or the actuator 72 are arranged in such a way that they protrude by not more than 50% from the area between the planes 68a and 68b. The actuator 72 may have a dimension or extension 74 parallel to the thickness direction y. A proportion of a maximum of 50%, a maximum of 30% or a maximum of 10% of the dimension 74 can project beyond the plane 68a and/or 68b, starting from an area between planes 68a and 68b, and, thus, project out of the virtual cuboid. This means that at the most, the actuator 72 projects only insignificantly from the plane 68a and/or 68b. According to embodiments, the actuator 72 does not project beyond the planes 68a and 68b. The advantage of this is that an extension of the multi-aperture imaging device along the thickness direction y is not increased by the actuator 72.

Although the beam deflector 18 is depicted to be rotatably mounted about an axis of rotation 76, the actuator 72 can alternatively or additionally also generate a translational movement along one or more spatial directions. The actuator 72 can comprise one or more single actuators, possibly to generate different single movements in an individually controllable manner. The actuator 72 or at least a single actuator thereof may, for example, be implemented as or comprise a piezo actuator, in particular a piezoelectric bending actuator, described in more detail in connection with FIG. 4. A piezo bender allows a fast and reproducible change of position. This feature is advantageous for the capturing of focus stacks in the sense of several or many images within a short time. Piezo benders as actuators designed along one dimension or direction can be advantageously employed, in particular, in the described architecture as they have a form factor that is advantageous for this, i.e. an extension especially in one direction.

The array 14 can include a substrate 78 to or at which optics 22a and 22b are attached or arranged. The substrate 78 may be at least partially transparent to the optical paths of the optical channels 16a and 16b by means of recesses or materials suitably selected; this does not preclude manipulation of the optical channels being performed, for example by arranging filter structures or the like.

Several requirements placed upon the actuator 72, including fast adjustability for fast setting of the different focal positions 56, a large force can be achieved by using piezoelectric actuators with small installation space and the like.

Figure 3B:
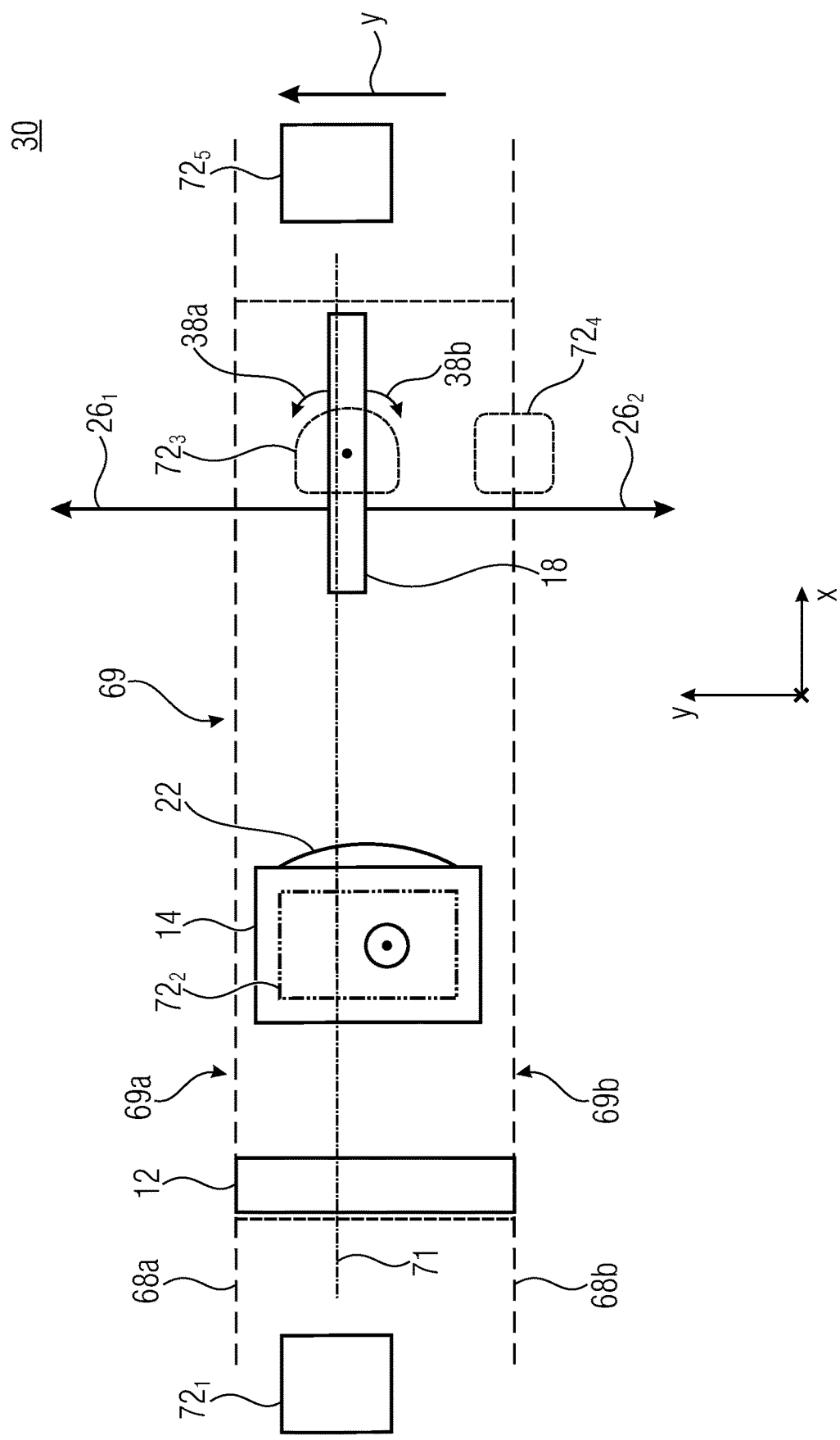
FIG. 3b shows a schematic lateral sectional view of the device of FIG. 3a according to an embodiment, wherein the multi-aperture imaging device comprises a plurality of actuators.

FIG. 3b shows a schematic lateral sectional view of the device 30 according to a embodiment. The multi-aperture imaging device of the device 30 may comprise, e.g., a plurality of actuators, e.g. more than one, more than two, or a different number >0. For example, actuators $72_1$ to $72_5$ may be arranged which can be used for different purposes, for example for adjusting the focal position and/or changing the position or location of the beam deflector 18 for setting the viewing direction of the multi-aperture imaging device and/or for providing optical image stabilization by rotational movement of the beam deflector 18 and/or translational movement of the array 14.

The actuators $72_1$ to $72_5$ can be arranged in such a way that they are at least partially arranged between the two planes 68a and 68b, which are spanned by the sides 69a and 69b of the virtual cuboid 69. The sides 69a and 69b of the cuboid 69 can be aligned parallel to each other and parallel to the line extension direction of the array and part of the beam path of the optical channels between the image sensor 12 and the beam deflector 18. The volume of the cuboid 69 is minimal but still includes the image sensor 12, the array 14 and the beam deflector 18 as well as their operational movements. Optical channels of array 14 have optics 22, which can be the same or different for each optical channel.

A volume of the multi-aperture imaging device may have a small or minimal installation space between the planes 68a and 68b. Along the lateral sides or extension directions of the planes 68a and/or 68b, an installation space of the multi-aperture imaging device can be large or arbitrarily large. The volume of the virtual cuboid is influenced, for example, by an arrangement of the image sensor 12, the single-line array 14 and the beam deflector, the arrangement of these components being such that, according to the embodiments described herein, the installation space of these components along the direction perpendicular to the planes and, thus, the distance of the planes 68a and 68b from each other becomes small or minimal. Compared to other arrangements of the components, the volume and/or distance of other sides of the virtual cuboid can be increased.

The virtual cuboid 69 is represented by dotted lines. The planes 68a and 68b can comprise or be spanned by two sides of the virtual cuboid 69. A thickness direction y of the multi-aperture imaging device may be normal to planes 68a and/or 68b and/or parallel to the y direction.

The image sensor 12, the array 14 and the beam deflector 18 may be arranged such that a vertical distance between the planes 68a and 68b along the thickness direction y, which—in a simplified manner, but without a restrictive effect—can be referred to as the height of the cuboid, is minimal, wherein a minimization of the volume, i.e. of the other dimensions of the cuboid, can be dispensed with. An extension of the cuboid 69 along the direction y may be minimal and be substantially predetermined by the extension of the optical components of the imaging channels, i.e. array 14, image sensor 12 and beam deflector 18, along the direction y.

A volume of the multi-aperture imaging device may have a small or minimal installation space between planes 68a and 68b. Along the lateral sides or extension directions of planes 68a and/or 68b, an installation space of the multi-aperture imaging device can be large or arbitrarily large. The volume of the virtual cuboid is influenced, for example, by an arrangement of the image sensor 12, the single-line array 14 and the beam deflector, the arrangement of these components being such that, according to the embodiments described herein, the installation space of these components along the direction perpendicular to the planes and, thus, the distance of the planes 68a and 68b from each other becomes small or minimal. Compared to other arrangements of the components, the volume and/or distance of other sides of the virtual cuboid can be increased.

The actuators $72_1$ to $72_5$ can each have a dimension or extension that is parallel to the direction y. A proportion not exceeding 50%, 30% or 10% of the dimension of each actuator $72_1$ to $72_5$ may protrude, starting from an area between both planes 68a and 68b, beyond plane 68a and/or 68b or protrude from said area. This means that the actuators $72_1$ to $72_5$ project, at the most, insignificantly beyond plane 68a and/or 68b. According to embodiments, the actuators do not protrude beyond planes 68a and 68b. The advantage of this is that an extension of the multi-aperture imaging device along the thickness direction, or direction y, is not increased by the actuators.

Although terms used here such as above, below, left, right, front or back are used for improved clarity, they are not intended to have any restrictive effect. It is obvious that these terms are mutually interchangeable on the basis of a rotation or tilt within space. For example, the x direction from the image sensor 12 to the beam deflector 18 can be understood as being at the front or forwards. For example, a positive y direction can be understood as being above. A region along the positive or negative z direction away from or at a distance from the image sensor 12, the array 14 and/or the beam deflector 18 can be understood as being adjacent to the respective component. In simpler terms, an image stabilizer may include at least one of the actuators $72_1$ to $72_5$. Said at least one actuator may be located within a plane 71 or between planes 68a and 68b.

In other words, actuators $72_1$ to $72_5$ can be located in front of, behind or next to image sensor 12, array 14 and/or beam deflector 18. According to embodiments, actuators 36 and 42 are arranged outside the area between planes 68a and 68b, with a maximum circumference of 50%, 30% or 10%.

Figure 3C:
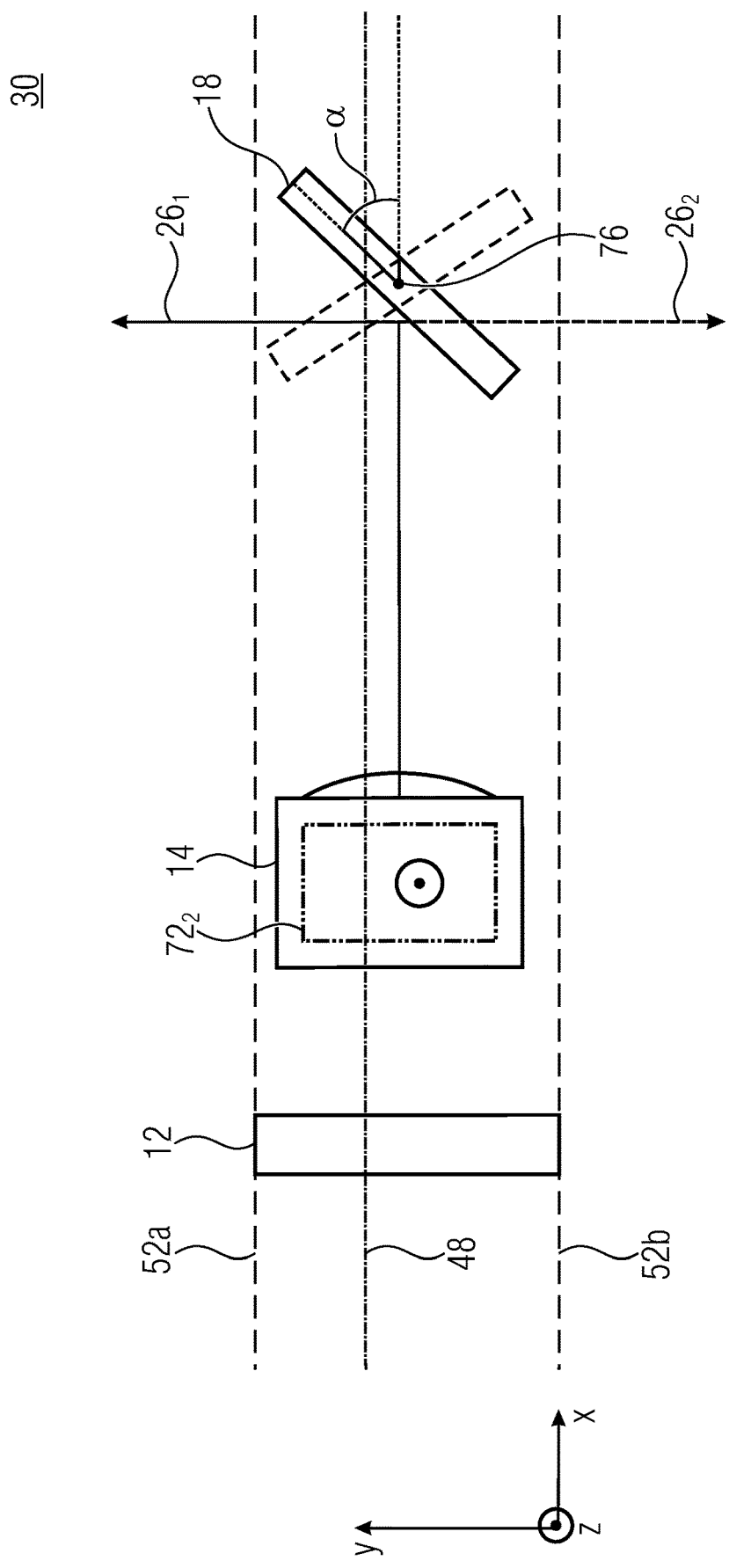
FIG. 3c shows a schematic lateral sectional view of the multi-aperture imaging device of FIG. 3a and/or 3b, in which different total fields of view can be detected on the basis of different positions of the beam deflector.

FIG. 3c shows a schematic lateral sectional view of the multi-aperture imaging device wherein different total fields of view $26_1$ and $26_2$ are detectable on the basis of different positions of the beam deflector 18 since the multi-aperture imaging device then has different viewing directions. The multi-aperture imaging device may be adapted to vary a tilt of the beam deflector by an angle α so that alternately, different main sides of the beam deflector 18 are arranged facing the array 14. The multi-aperture imaging device may include an actuator adapted to tilt the beam deflector 18 about the rotation axis 76. For example, the actuator may be adapted to move the beam deflector 18 to a first position in which the beam deflector 18 deflects the beam path 26 of the optical channels of the array 14 to the positive y direction. For this purpose, the beam deflector 18 may have, in the first position, e.g. an angle α of >0° and <90°, of at least 10° and at most 80° or of at least 30° and at most 50°, e.g. 45°. The actuator may be adapted to deflect the beam deflector, in a second position, about the axis of rotation 76 so that the beam deflector 18 deflects the beam path of the optical channels of the array 14 towards the negative y direction as represented by the viewing direction toward the total field of view $26_2$ and by the dashed representation of the beam deflector 18. For example, the beam deflector 18 can be configured to be reflective on both sides, so that in the first position, the viewing direction points towards the total field of view $26_1$.

Figure 4A:
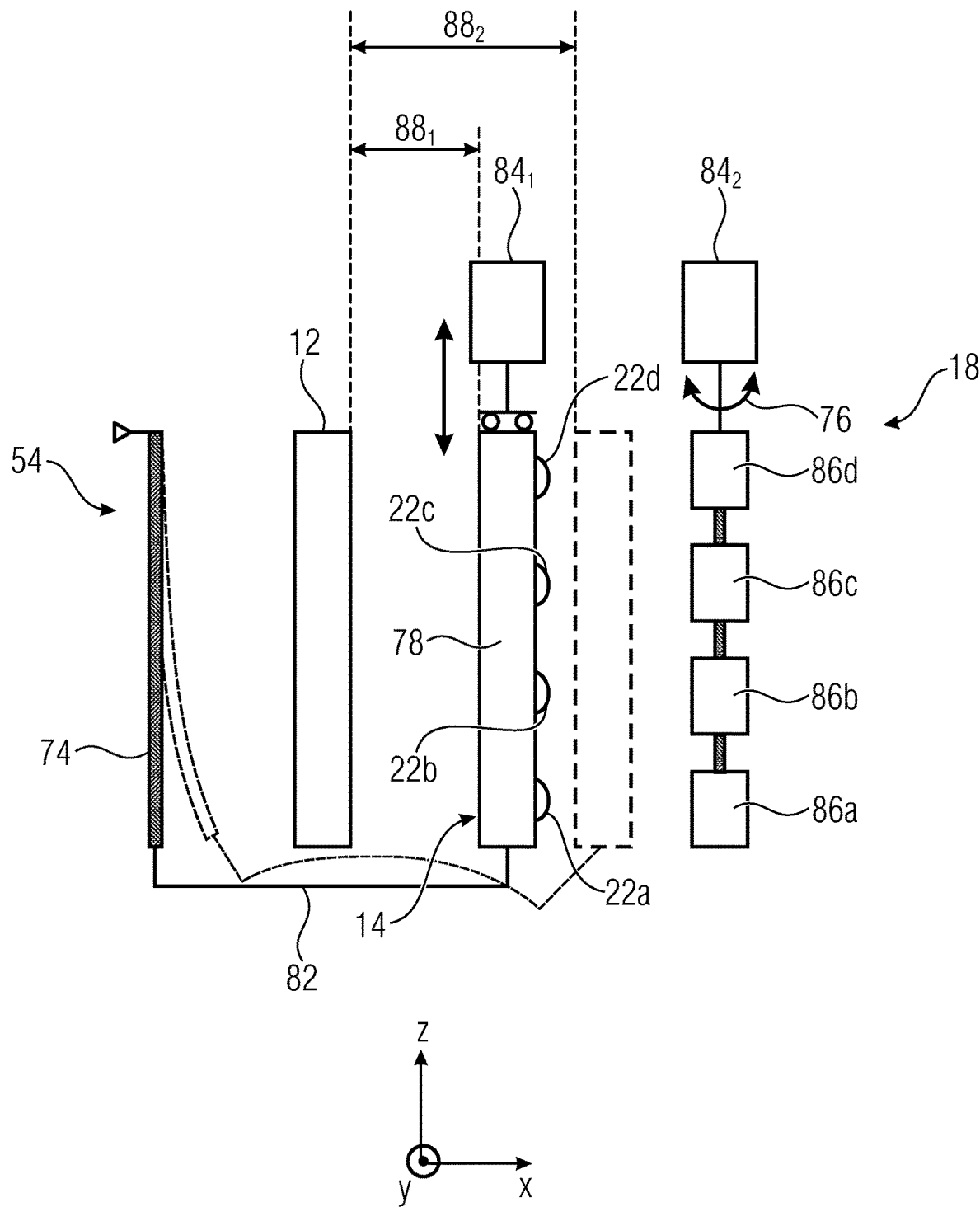
FIG. 4a shows a schematic top view of a device according to a embodiment in which the actuator is formed as a piezoelectric bending actuator.

FIG. 4a shows a schematic top view of a device 40 according to a embodiment in which the actuator 72 is formed as a piezoelectric bending actuator. Actuator 72 is configured to perform a bend in the x/z plane as shown by the dashed lines. The actuator 72 is connected to the array 14 via a mechanical deflector 82, so that a lateral displacement of the array 14 along the x direction can occur when the actuator 72 is bent, so that the focal position can be changed. For example, actuator 72 can be connected to substrate 78. Alternatively, the actuator 72 can also be mounted on a housing that houses at least part of the optics 22a to 22d to move the housing. Other variants are also possible.

Optionally, the device may include 40 further actuators $84_1$ and $84_2$ configured to generate movement at the array 14 and/or the beam deflector 18, for example to place the beam deflector 18 in different positions or locations and/or for optical image stabilization by translational displacement of the array 14 along the z direction and/or by generating rotational movement of the beam deflector 18 about the axis of rotation 76.

Unlike it is described in the preceding figures, the beam deflector 18 may have several spaced-apart but common movable facets 86a to 86d, each optical channel being associated with one facet 86a to 86d. The facets 86a to 86d can also be arranged to be directly adjacent, i.e. with little or no distance between them. Alternatively, a flat mirror can also be arranged.

By actuating the actuator 72, a distance $88_1$ between at least one of the optics 22a-d and the image sensor 12 can be changed from a first value $88_1$ to a second value $88_2$, e.g. increased or decreased.

Figure 4B:
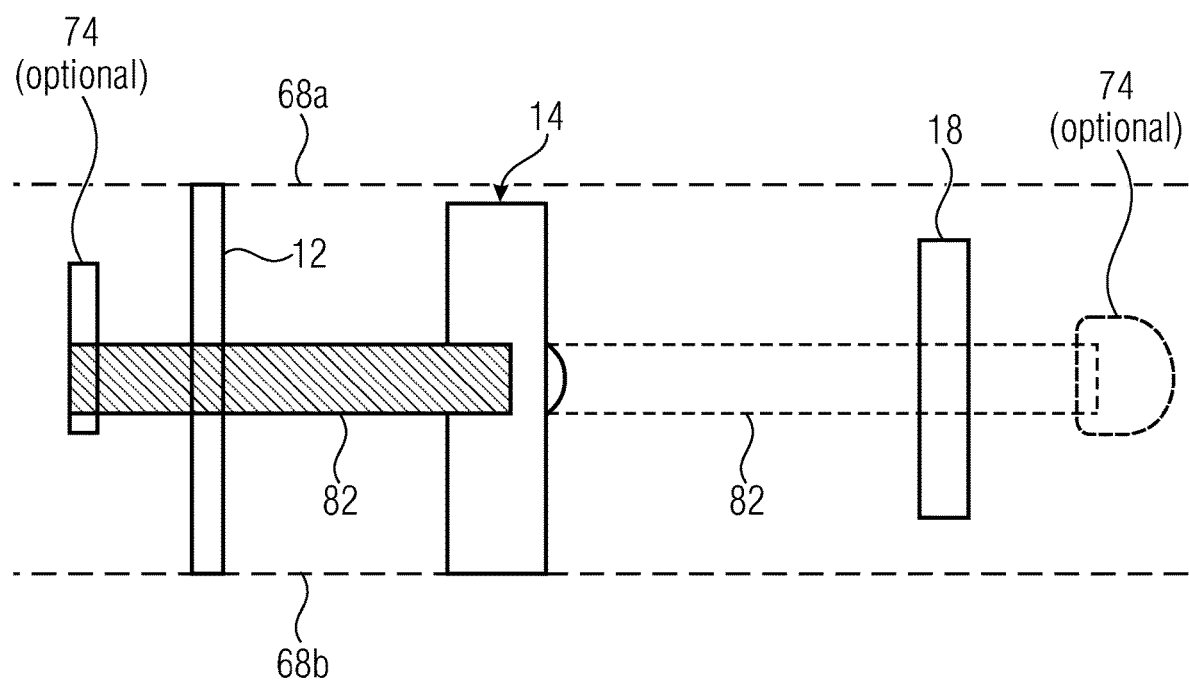

FIG. 4b shows a schematic lateral sectional view of device 40 to illustrate the arrangement of actuator 72 between planes 68a and 68b described in connection with FIG. 3a. The actuator 72, for example, is arranged completely between planes 68a and 68b, as is the mechanical deflection device 82, which uses several force-transmitting elements such as connecting webs and wires, ropes or the like and mechanical bearings or deflection elements.

The mechanical deflector or mechanical means for transmitting the movement to the array 14 can be arranged on one side of the image sensor 12 which faces away from the array 14, i.e. starting from the array 14 behind the image sensor 12. The mechanical means 82 can be arranged in such a way that a flux of force laterally passes the image sensor 12. Alternatively or additionally, the actuator 72 or another actuator may be located on a side of the beam deflector 18 which faces away from the array 14, i.e. starting from the array 14 behind the beam deflector 18. The mechanical means 82 may be arranged such that a flux of force laterally passes the beam deflector 18.

Although only one actuator 72 is shown, a larger number of actuators can also be arranged, and/or more than one side of actuator 72 can be connected to a mechanical deflector 82. For example, a centrally mounted or supported actuator 72 may be connected on two sides to a mechanical deflector 82 and may act, for example, on both sides of the array 14 to enable homogeneous movement.

Figure 5A:
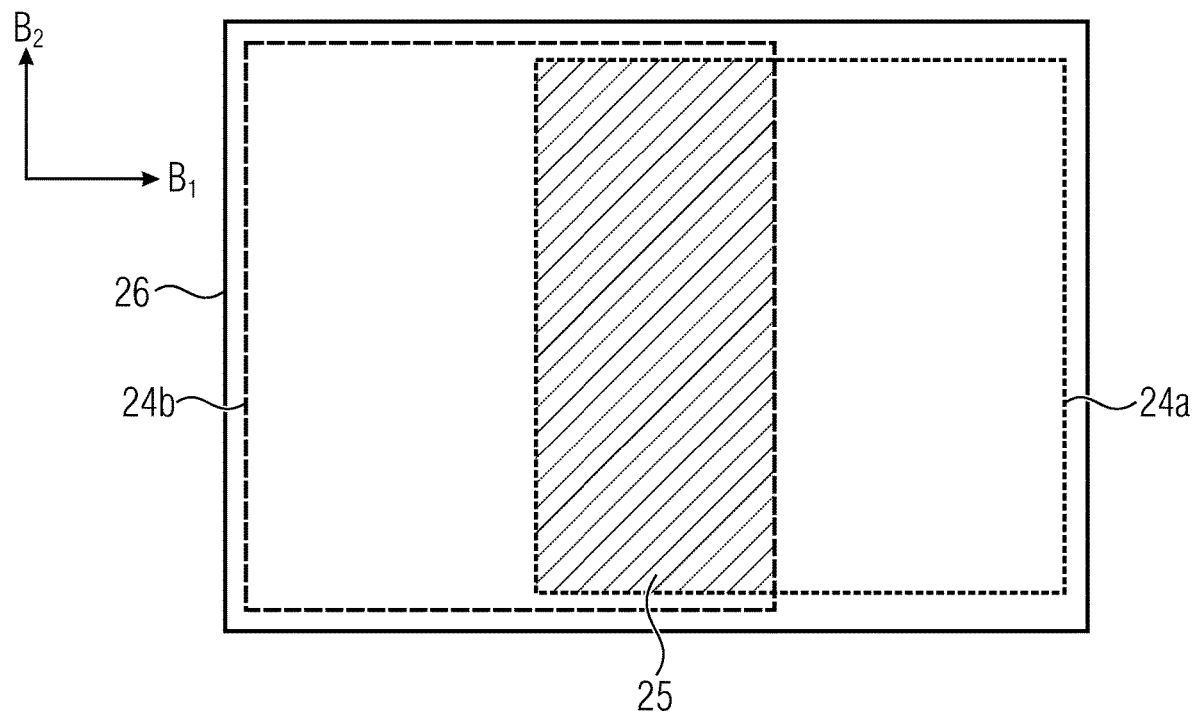
FIGS. 5a-5c show schematic representations of arrangements of partial fields of view in a total field of view, according to an embodiment.

FIG. 5a shows a schematic representation of an array of partial fields of view 24a and 24b in a total field of view 26 which is detectable, for example, by a multi-aperture imaging device described herein, such as the multi-aperture imaging device $10_1$, $10_2$, $10_3$, 30 and/or 40, and may correspond, for example, to the total field of view $26_1$ and/or $26_2$. For example, the total field of view 26 can be projected on the image sensor area 28b by using the optical channel 16b. For example, optical channel 16a can be configured to capture the partial field of view 24a and project it on the image sensor area 28a. Another optical channel, such as optical channel 16c, may be configured to detect the partial field of view 24b and to project it on the image sensor area 28c. This means that a group of optical channels can be formed to capture exactly two partial fields of view 24a and 24b. Thus, simultaneous capturing of the total field of view and of the partial fields of view, which, in turn, together represent the total field of view 26, can take place.

Although shown with different extensions for improved distinguishability, partial fields of view 24a and 24b may have the same extension or comparable extensions along at least one image direction $B_1$ or $B_2$, such as image direction $B_2$. The extension of the partial fields of view 24a and 24b can be identical to the extension of the total field of view 26 along the image direction $B_2$. This means that the partial fields of view 24a and 24b may completely capture, or pick up, the total field of view 26 along the image direction $B_2$ and may only partially capture, or pick up, the total field of view along another image direction $B_1$ arranged perpendicular to the former and may be arranged in a mutually offset manner so that complete capture of the total field of view 26 combinatorially results also along the second direction. The partial fields of view 24a and 24b may be disjoint from each other or at most incompletely overlap each other in an overlap area 25, which possibly extends completely along the image direction $B_2$ in the total field of view 26. A group of optical channels comprising optical channels 16a and 16c may be configured to fully image the total field of view 26 when taken together, for example by a total picture taken in combination with partial pictures taken which, when taken together, image the total field of view. The image direction $B_1$, for example, can be a horizontal line of an image to be provided. In simplified terms, the image directions $B_1$ and $B_2$ represent two different image directions that can be positioned anywhere in the room.

Figure 5B:
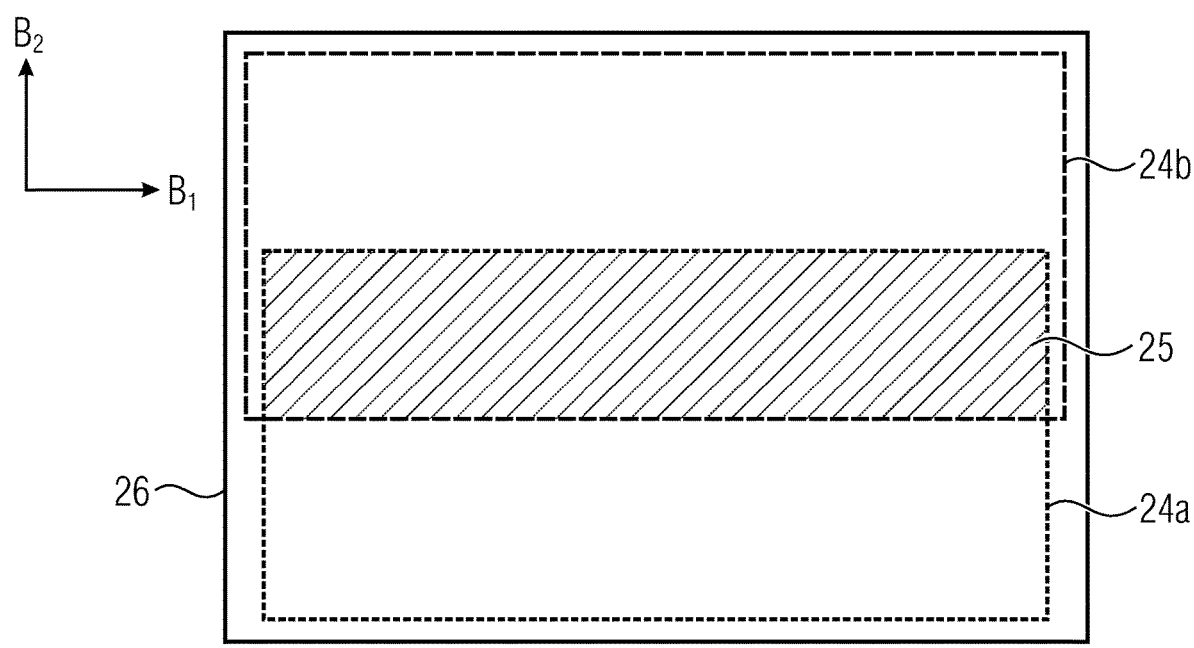

FIG. 5b shows a schematic representation of an arrangement of the partial fields of view 24a and 24b, which are arranged in a mutually offset manner along a different image direction, image direction $B_2$, and overlap each other. The partial fields of view 24a and 24b can each capture the total field of view 26 completely along image direction $B_1$ and incompletely along image direction $B_2$. The overlap area 25, for example, is arranged completely within the total field of view 26 along the image direction $B_1$.

Figure 5C:
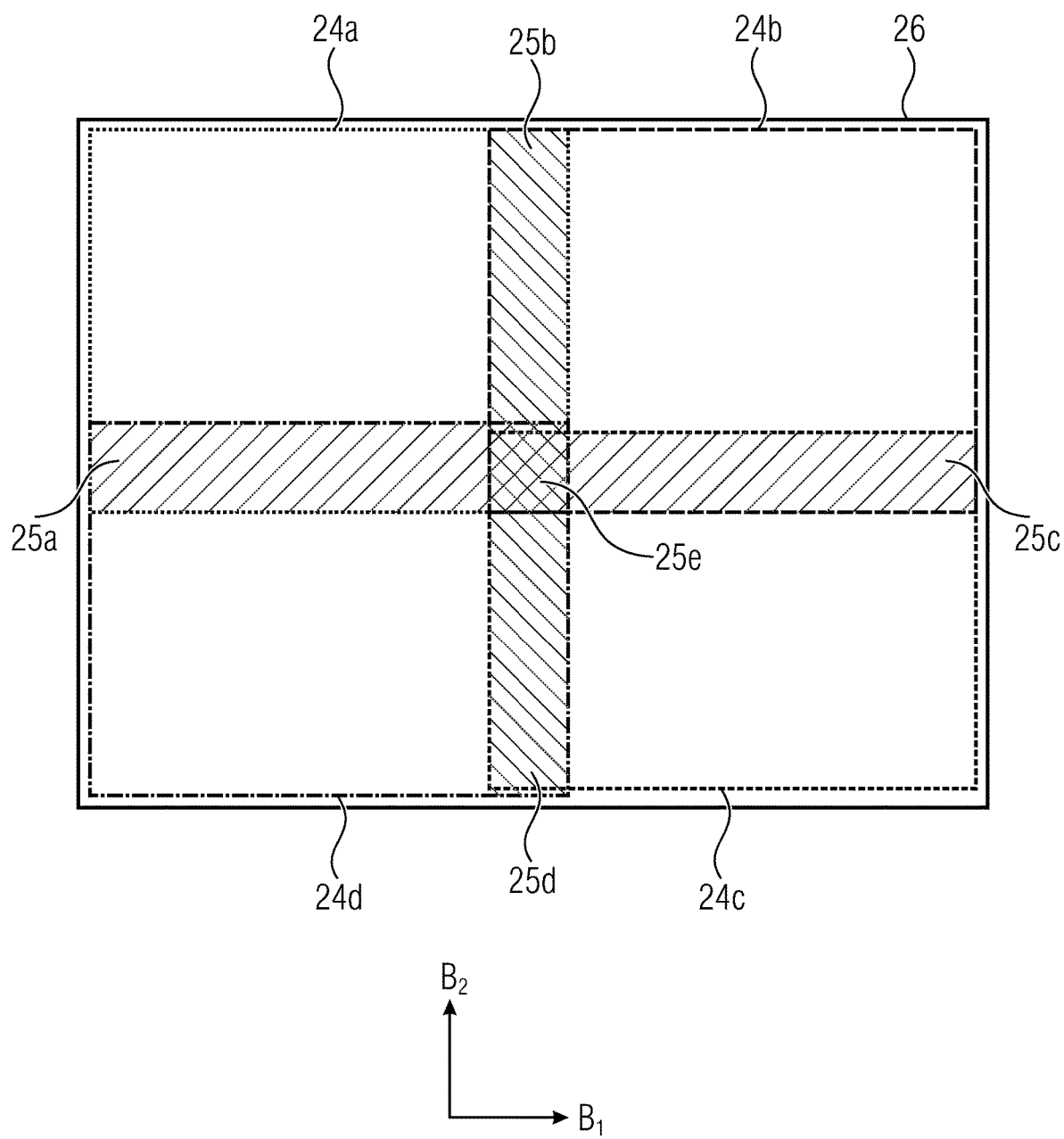

FIG. 5c shows a schematic representation of four partial fields of view 24a to 24b, which incompletely capture the total field of view 26 in both directions $B_1$ and $B_2$, respectively. Two adjacent partial fields of view 24a and 24b overlap in an overlap area 25b. Two overlapping partial fields of view 24b and 24c overlap in an overlap area 25c. Similarly, partial fields of view 24c and 24d overlap in an overlap area 25d, and partial fields of view 24d overlap with partial fields of view 24a in an overlap area 25a. All four partial fields of view 24a to 24d can overlap in an overlap area 25e of the total field of view 26.

A multi-aperture imaging device similar to that described in relation to FIG. 1a-c may be used to capture the total field of view 26 and the partial fields of view 24a-d, for example; the array 14 may have five optics, four to capture the partial fields of view 24a-d, and one optics to capture the total field of view 26. Accordingly, the array may be configured with three optical channels with regard to FIG. 5a-b.

In the overlap areas 25a to 25e, a large number of image information is available. For example, the overlap area 25b is captured via the total field of view 26, the partial field of view 24a and the partial field of view 24b. An image format of the total field of view can correspond to a redundancy-free combination of the imaged partial fields of view, for example of the partial fields of view 24a-d in FIG. 5c, where the overlap areas 25a-e are only counted once in each case. In connection with FIGS. 5a and 5b, this applies to the redundancy-free combination of the partial fields of view 24a and 24b.

An overlap in the overlap areas 25 and/or 25a-e may, for example, include a maximum of 50%, 35% or 20% of the respective partial images.

In other words, according to the first aspect, a reduction in the number of optical channels can be obtained, which allows cost savings and a reduction in lateral installation space requirements. According to the first aspect, a form of depth information acquisition, which is an alternative to stereoscopic acquisition, is possible without the need for additional sensors such as Time of Flight, Structured or Coded Light and the like. time-of-flight sensors, which enable low resolution, as well as structured-light sensors, which have a high energy requirement, can thus be avoided.

Both approaches still have problems with intense ambient lighting, especially sunlight. Embodiments provide that the corresponding device is designed without such sensors. According to an embodiment, a piezo bender serves as an extremely fast focus factor with low power consumption. The described architecture of the multi-aperture imaging device allows the use of such piezo benders since an otherwise cubic form factor of the camera module makes utilization of long piezo benders more difficult or even impossible. With a short exposure time, this allows shooting focus stacks, i.e. numerous pictures taken quickly one after the other with slightly different focusing of the scene. Embodiments provide that the entire depth of the scene is sampled in a useful manner, for example from macro, the closest possible shot, to infinity, that is, at the largest possible distance. The distances can be arranged equidistantly in the object space, but advantageously in the image space. Alternatively, a different reasonable distance can be chosen. For example, a number of focal positions is at least two, at least three, at least five, at least ten, at least 20, or any other number.

Several images 42 can be presented to the user. Alternatively or additionally, embodiments provide for combining the individual image information so that the user can be provided with an image that has combined image information. For example, an image with depth information, which offers the possibility of digital refocusing. The presented image can offer a so-called Bokeh effect, defocusing. Alternatively, the image can also be presented in such a way that the entire image is artificially sharp, which means that a larger distance range than in the single frames of partial areas is in focus, for example the entire image. With a low aperture value of the lenses used, the sharpness or blur measured in the single frames and further information, such as the sharpness of the same objects in adjacent images of the stack, association of the focus actuator position with an object distance, for example while using a calibrated lookup table, a direction of the through-focus scan may be used—with regard to said frames themselves but also, in a recursive manner, from other images in order to avoid ambiguities—for reconstructing the object distance of the individual elements of the scene and to create therefrom a depth map in image resolution.

According to the first aspect one achieves that duplication of the channels for a stereo image can be omitted while a depth map can still be created. This depth map enables the stitching of the different partial images of the multi-aperture imaging device. For example, by halving the number of optical channels, a significant reduction of the lateral dimensions, e.g. along the line extension direction, and, thus, also a cost reduction can be achieved. Image processing can provide images that are at least as good through other steps.

Figure 6:
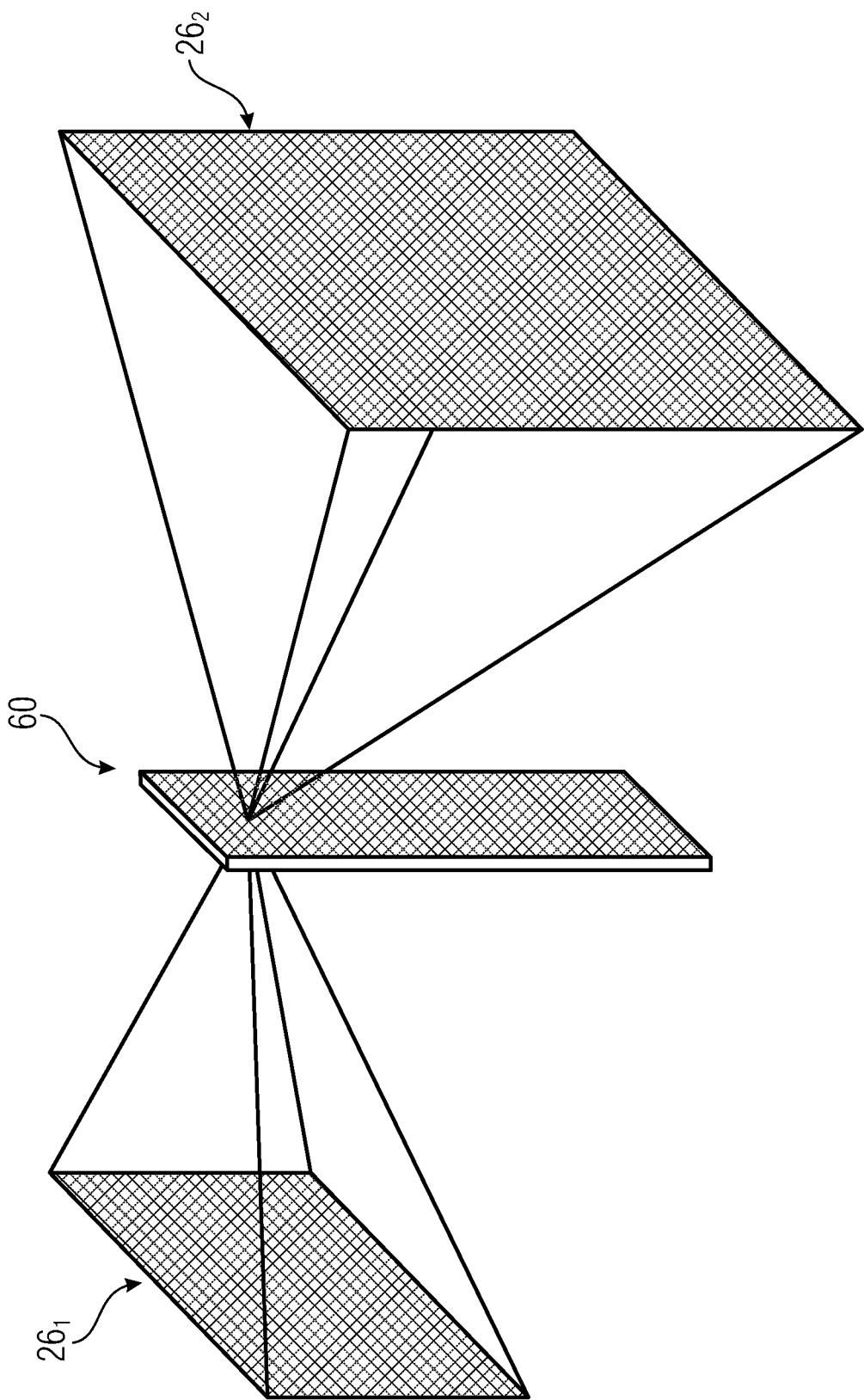
FIG. 6 shows a schematic perspective view of a device according to an embodiment of the second aspect.

FIG. 6 shows a schematic perspective view of a device 60 according to an embodiment with respect to the second aspect. The implementations described above readily apply also to devices $10_1$, $10_3$, 30 and/or 40. By directing the beam deflector to different positions, the device 60 or the multi-aperture imaging device of the device 60 can capture two mutually spaced-apart entire fields of view $26_1$ and $26_2$.

The device 60 is designed, for example, as a portable or mobile device, in particular a tablet computer or a mobile phone, in particular a smartphone (intelligent telephone).

One of the fields of view $26_1$ and $26_2$ may, for example, be arranged along a user direction of the device 60, as is common practice, for example, in the case of selfies for photos and/or videos.

The other total field of view may be arranged, for example, along an opposite direction and/or a world direction of the device 60 and may be arranged, for example, along the direction along which the user looks when he/she looks at the device 60 along the user direction from the total field of view. For example, the beam deflector 18 in FIG. 1*b* can be formed to be reflective on both sides and deflect the beam path of the optical channels 16*a*-*d* in different positions with different main sides, for example, so that starting from the device 60, the total fields of view $26_1$ and $26_2$ are arranged opposite one another and/or at an angle of 180°.

Figure 7A:
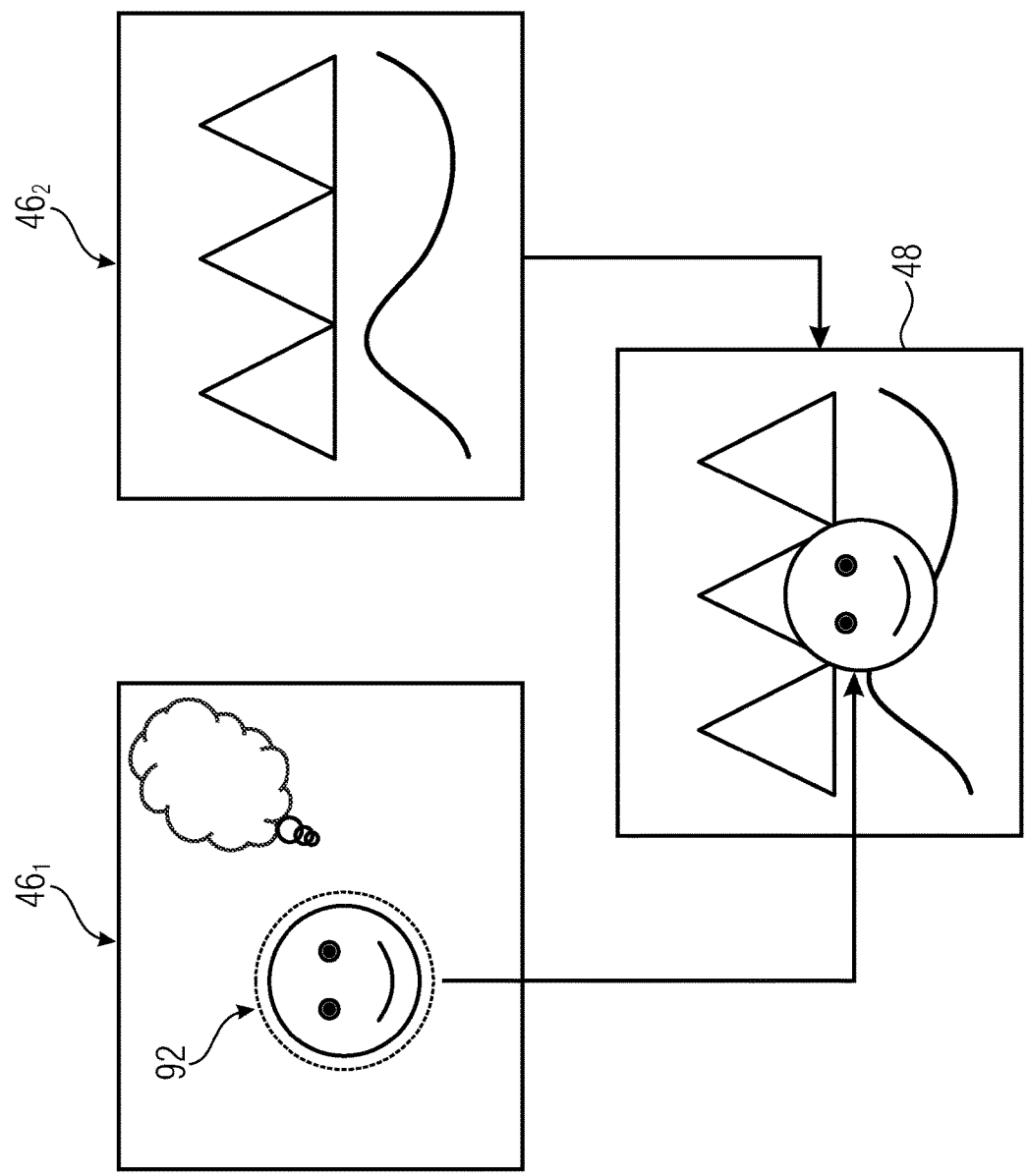
FIG. 7a shows a schematic diagram illustrating processing of the image information that can be obtained by imaging the total fields of view according to an embodiment.

FIG. 7*a* shows a schematic diagram to illustrate processing of image information $46_1$ and $46_2$, which can be obtained by imaging the total fields of view $26_1$ and $26_2$. The control means is configured to separate, for example cut out, or isolate, a part 92 of the imaging information $46_1$ of the field of view $26_1$ or to copy exclusively said part 92. The control means is further adapted to combine the separated or segmented part 92 with the imaging information $46_2$, i.e. to insert part 92 into the imaging information $46_2$ to obtain the accumulated image information 48. In places, the latter exhibits the total field of view $26_2$ and in places, namely where part 92 was inserted, it exhibits the image information 46*i*. It should be noted that the obtaining of the accumulated image information 48 is not limited to the insertion of a single part 92, but that any number of parts 92 can be segmented from image information $46_1$ and one, several or all of these parts can be inserted into image information $46_2$.

A location or position at which the part 92 is inserted into the second imaging information $46_2$ may be automatically determined by the control means, for example by projecting the part 92 through the device 60 into the second field of view $26_2$, but may alternatively or additionally also be selected by a user.

According to an embodiment, the control means is configured to identify and segment a person in the first imaging information $46_1$, for example via pattern matching and/or edge detection, but in particular on the basis of the depth map generated by the device itself. Said control means may be adapted to insert the image of the person into the second imaging information $46_2$ to obtain the accumulated image information 48. This means that part 92 can be a person, such as a user of the device 60. Embodiments provide that the device is configured to automatically identify the person and to automatically insert the image of the person, that is, part 92, into the second imaging information $46_2$. This makes it possible to automatically create a self-portrait or a self-portrait in front of or in the second total field of view $26_2$ without having to position the device 60 in a time-consuming manner and/or without having to position the user in a time-consuming manner.

Embodiments provide that the control means uses a depth map, such as the depth map 38, to position part 92 in the second imaging information $46_2$. The depth map 38 may have a plurality or multiplicity of depth planes, for example in accordance with the number of focal positions considered or a reduced number obtained therefrom or a larger number interpolated therefrom. The control means may be adapted to insert the part 92 into the predetermined depth plane of the second imaging information $46_2$ to obtain the accumulated image information 48. The predetermined depth plane may correspond substantially, i.e. within a tolerance range of ±10%, ±5% or ±2%, to a distance of the first total field of view $26_2$ from the device 60 or to the distance of the segmented part 92 from the device 60, respectively. This may also be referred to as inserting the part 92 into the second imaging information $46_2$ in a manner that is correct in terms of depth.

Figure 7B:
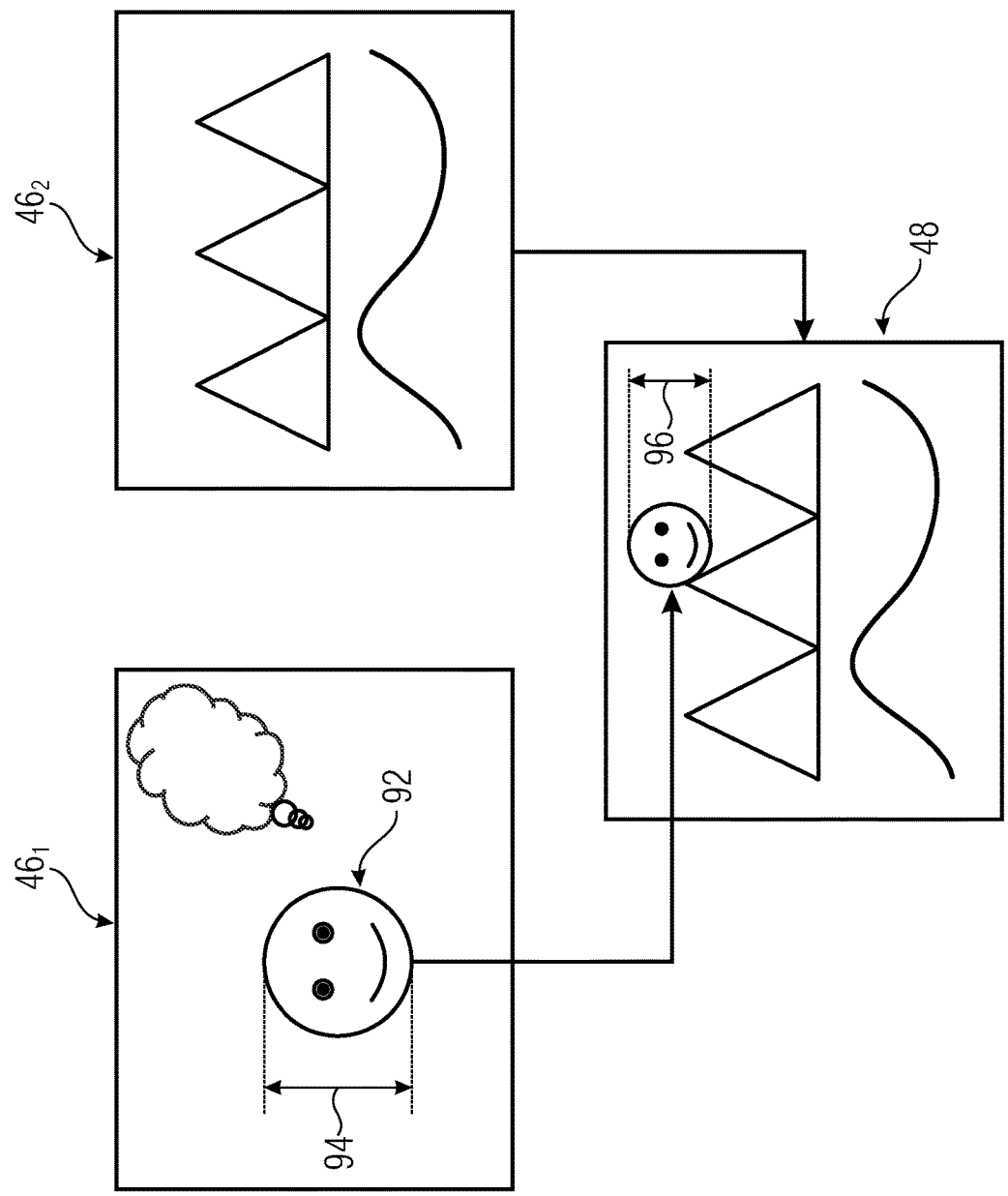
FIG. 7b shows a schematic representation of scaling of a portion of image information in the accumulated image information according to an embodiment.

FIG. 7*b* shows a schematic representation of scaling of part 92 in the accumulated image information 48. Alternatively, a different depth plane can be selected, for which purpose various possibilities of embodiments are provided. For example, the predetermined depth plane may be influenced by or determined by the placement of part 92 in the second imaging information $46_2$. The placement can be effected automatically or by a user input. For example, if the user selects a particular location or place within the second imaging information $46_2$ for inserting the part 92, the control means may be configured to determine, in the second imaging information $46_2$, a distance of the area in which part 92 is to be inserted. Knowing the distance of part 92 from the device and the objects in the second imaging information $46_2$, for example while using depth maps, a virtual distance change of part 92 caused by user input may be compensated for by scaling part 92.

Thus, a one-dimensional, two-dimensional or three-dimensional size 94 of the part 92 can be changed, e.g. reduced, to a size 96 when the distance of the part 92 from the first imaging information $46_1$ to the second imaging information $46_2$ is increased, or may be increased to a size 96 when the distance from the first imaging information $46_1$ to the second imaging information $46_2$ is reduced. Independently thereof, but also in combination placing part 92 in the first imaging information $46_1$ on the basis of an associated user input, the device may be configured to scale the imaging information $46_1$ to obtain scaled imaging information. The scaled imaging information may be inserted into the imaging information $46_2$ by the control means to obtain the accumulated image information 48. The device may be configured to determine a distance of an object, which represents part 92 and is imaged in the first imaging information $46_1$, with respect to the device 60. The device may scale the imaging information $46_1$, or the part 92 thereof, on the basis of a comparison of the determined distance with the predetermined depth plane in the second imaging information $46_2$. It is advantageous if the two items of imaging information $46_1$ and $46_2$ are captured within short distances of time. It is advantageous if this distance of time within a time interval of not more than 30 ms, not more than 10 ms, not more than 5 ms or not more than 1 ms is approximately 0.1 ms. This time can be used, for example, for a changeover or repositioning of the beam deflector and can be at least partly determined by a duration of this process.

The accumulated image information 48 can be obtained as a single frame, alternatively or additionally also as a video data stream, for example as a large number of single frames.

According to an embodiment, an device is formed, in line with the second aspect, such that the first imaging information $46_1$ comprises an image of a user, and that the second imaging information $46_2$ comprises a world view of the device. The control means is configured to segment an image of the user from the first imaging information $46_1$ and to insert it into the world view. For example, the device can be configured to insert the image of the user into the world view in the correct depth.

In other words, in the context of the second aspect, taking a selfie image or shooting a video may include a depth-based combination of quasi-simultaneous picture-taking with a front-facing camera/view and a main camera/view of a device, in particular a mobile phone. The foreground of the selfie, i.e. the self-portrait, can be transferred to the foreground of the picture taken by the main camera. A very fast switchover between front and rear picture-taking by changing the position of the beam deflector allows the above-mentioned quasi-simultaneous capturing of the world-side and the user-side camera images with the same image sensor. Although a single-channel imaging device can also be used according to the second aspect, the second aspect provides advantages especially with regard to multi-aperture imaging devices, as they can already create or use a depth map to merge the frames. This depth map can also be used to determine depth information for synthesizing the accumulated imaging information 48. A procedure is made possible which can be described as follows:
1. Use the depth map of the selfie so as to segment the foreground, i.e. the person(s) taking (a) picture(s) of themselves, from the background;
2. Use the depth map of the world-side picture to identify a foreground and a background from it, that is, to separate depth information; and
3. Insert the foreground, i.e. the person(s) taking (a) picture(s) of themselves, from the selfie into the picture of the world-side shot, especially into its foreground.

The advantage of this is that the selfie shot can be combined with the world-side picture as background, without having to turn the phone by 180°, as otherwise useful, in order to take a picture of yourself in front of this scene. Alternatively or additionally, it is avoided that you take a picture past yourself in a rearward direction, which involves remembering that the orientation of the telephone is typically mirror-inverted in relation to the scene. The depth map itself can be generated according to the second aspect, too, as is described in connection with the first aspect, so that the additional arrangement of time-of-flight sensors or structured-light sensors can be dispensed with.

In the following, reference will be made to some advantageous implementations of the multi-aperture imaging device to explain advantages of the invention.

Figure 8:
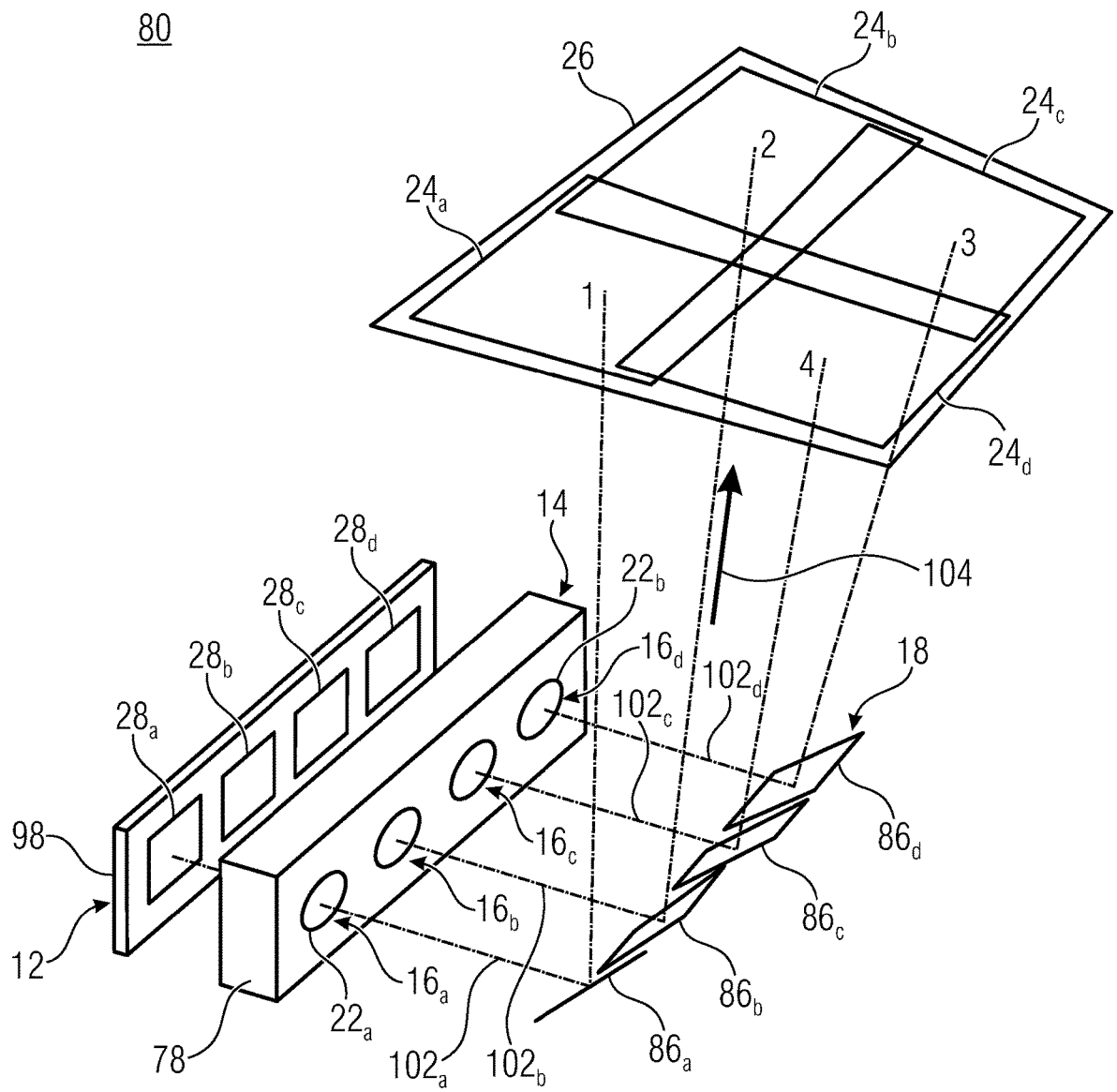
FIG. 8 shows parts of a multi-aperture imaging device according to an embodiment, which can be used in inventive devices of the first and/or second aspect(s).

FIG. 8 shows parts of a multi-aperture imaging device 80 which can be used in inventive devices of the first and/or second aspect(s), wherein a possible focusing means and/or actuator for implementing optical image stabilization are not represented but can easily be implemented.

The multi-aperture imaging device 80 of FIG. 8 comprises an array 14 of adjacently arranged optical channels 16a-d, which is formed in several lines or advantageously in one line. Each optical channel 16a-d comprises optics 22a-d for imaging a respective partial field of view 24a-d of a total field of view 26, or possibly a total field of view, as described in connection with FIG. 5. The field of view shown on the multi-aperture imaging device 80 is projected on a respectively associated image sensor area 28a-d of an image sensor 12.

The image sensor areas 28a-d, for example, may each be formed from a chip comprising a corresponding pixel array; the chips may be mounted on a common substrate or board 98, as indicated in FIG. 8. Alternatively, it would of course also be possible for each of the image sensor areas 28a-d to be formed from part of a common pixel array that extends continuously or with interruptions across the image sensor areas 28a-d, with the common pixel array being formed, for example, on a single chip. For example, only the pixel values of the common pixel array in the image sensor areas 28a-d will then be read out. Different mixtures of these alternatives are of course also possible, such as the presence of a chip for two or more channels and a further chip for yet other channels or the like. In the case of several chips of the image sensor 12, they can be mounted on one or more boards, e.g. altogether or in groups or the like.

In the example of FIG. 8, four optical channels 16a-d are arranged in one line next to one another in the line extension direction of the array 14, but the number four is only exemplary and might be any other number greater than one, i.e., N optical channels with N>1 can be arranged. In addition, the array 14 may also have further lines that extend along the line extension direction. An array 14 of optical channels 16a-d is understood to be a combination of the optical channels or a spatial grouping thereof. Optics 22a-d can each have a lens, but also a lens compound or lens stack, as well as a combination of imaging optics and other optical elements, including filters, apertures, reflective or diffractive elements or the like. Array 14 can be designed in such a way that the optics 22a-d are arranged, fixed or mounted on the substrate 78 in a channel-specific manner, in groups or all channels taken together. This means that a single substrate 78, several parts thereof, or no substrate 78 may be arranged, for example if the optics 22a-d are mounted elsewhere.

Optical axes or the beam paths 102a-d of the optical channels 16a-d may extend, according to an example, in parallel with one another between the image sensor areas 28a-d and the optics 22a-d. To this end, the image sensor areas 28a-d are arranged in a common plane, for example, as are the optical centers of optics 22a-d. Both planes are parallel to each other, i.e. parallel to the common plane of the image sensor areas 28a-d. In addition, in a projection perpendicular to the plane of the image sensor areas 28a-d, optical centers of the optics 22a-d coincide with centers of the image sensor areas 28a-d. In other words, in these parallel planes, the optics 22a-d, on the one hand, and the image sensor areas 28a-d are arranged in line extension direction at the same pitch.

An image-side distance between image sensor areas 28a-d and the associated optics 22a-d is set such that the images on the image sensor areas 28a-d are set to a desired object distance. For example, the distance is within a range equal to or greater than the focal length of optics 22a-d or within a range between the focal length and double the focal length of optics 22a-d, both inclusive. The image-side distance along the optical axis 102a-d between the image sensor area 28a-d and the optics 22a-d may also be settable, e.g. manually by a user and/or automatically via a focusing means or autofocus control.

Without any additional measures, the partial fields of view 24a-d of the optical channels 16a-d overlapped completely essentially due to the parallelism of the beam paths, or optical axes, 102a-d. The beam deflector 18 is provided to cover a larger total field of view 26 and so that the partial fields of view 24a-d only partially overlap in space. The beam deflector 18 deflects the beam paths 102a-d, or optical axes, e.g. with a channel-specific deviation into a total-field-of-view direction 104. For example, the total-field-of-view direction 104 extends in parallel with a plane that is perpendicular to the line extension direction of array 14 and is parallel to the course of the optical axes 102a-d prior to or without beam deflection. For example, the total-field-of-view direction 104 of the optical axes 102a-d is obtained by rotating the line extension direction around an angle that is >0° and <180° and, for example, lies between 80 and 100° and, for example, can be 90°. The total field of view 26 of the multi-aperture imaging device 80, which corresponds to the total coverage of the partial fields of view 24a-d, is thus not located in the direction of an extension of the series connection of the image sensor 12 and the array 14 in the direction of the optical axes 102a-d, but due to the beam deflection, the total field of view is located laterally to the image sensor 12 and array 14 in a direction in which the installation height of the multi-aperture imaging device 80 is measured, i.e. the lateral direction perpendicular to the line extension direction.

In addition, however, the beam deflector 18 deflects, for example, each beam path or the beam path of each optical channel 16a-d with a channel-specific deviation from the just mentioned one to deflection leading to the direction 104. The beam deflector 18 for each channel 16a-d includes, for example, an individually installed element, such as a reflective facet 86-d and/or a reflective surface. These are slightly inclined towards each other. The mutual tilting of the facets 86a-d is selected in such a way that when the beam is deflected by the beam deflector 18, the partial fields of view 24a-d are provided with a slight divergence in such a way that the partial fields of view 24a-d overlap only partially. As shown exemplarily in FIG. 8, individual deflection can also be implemented in such a way that the partial fields of view 24a-d cover the total field of view 26 in a two-dimensional manner, i.e. they are distributed in a two-dimensional manner in the total field of view 26.

According to another example, the optics 22a-d of an optical channel can be established to completely or partially generate the divergence in the beam paths 102a-d, which makes it possible to completely or partially dispense with the inclination between individual facets 86a-d. If, for example, the divergence is provided completely by optics 22a-d, the beam deflector can also be formed as a planar mirror.

It should be noted that many of the details regarding the multi-aperture imaging device 80 which have been described so far have been chosen as examples only. This was the case, for example, with the above-mentioned number of optical channels. The beam deflector 18 can also be formed differently than previously described. For example, the beam deflector 18 is not necessarily reflective. It can therefore also be designed differently than in the form of a facetted mirror, e.g. in the form of transparent prism wedges. In this case, for example, the mean beam deflection might be 0°, i.e. the direction 104 might, for example, be parallel to the beam paths 102a-d prior to or without beam deflection, or in other words, the multi-aperture imaging device 80 might still "look straight ahead" despite the beam deflector 18. Channel-specific deflection by the beam deflector 18 would again result in the partial fields of view 24a-d overlapping each other only slightly, e.g. in pairs with an overlap of <10% in relation to the solid angle ranges of the partial fields of view 24a-d.

Also, the beam paths 102a-d, or the optical axes, might deviate from the described parallelism, and nevertheless the parallelism of the beam paths of the optical channels might still be sufficiently pronounced for the partial fields of view, which are covered by the individual channels 16a-N and/or are projected on the respective image sensor areas 28a-d, would largely overlap if no any further measures such as beam deflection are taken, so that, in order to cover a larger total field of view by the multi-aperture imaging device 80, the beam deflector 18 provides the beam paths with an additional divergence such that the partial fields of view of N optical channels 16a-N overlap one another less. The beam deflector 18, for example, ensures that the total field of view has an aperture angle that is greater than 1.5 times the aperture angle of the individual partial fields of view of the optical channels 16a-N. With a kind of pre-divergence of the beam paths 102a-d, it would also be possible, for example, that not all facet inclinations differ, but that some groups of channels, for example, have facets with the same inclination. The latter can then be formed in one piece or such that they continuously merge into one another, quasi as one facet which is associated with this group of channels that are adjacent in the line extension direction.

The divergence of the optical axes 102a-d of these channels 16a-d might then originate from the divergence of these optical axes 102a-d, as is achieved by a lateral offset between optical centers of the optics 22a-d and image sensor areas 28a-d of the channels 16a-d or prism structures or decentered lens sections. For example, the pre-divergence might be limited to one plane. For example, the optical axes 102a-d might extend within a common plane prior to or without any beam deflection 18, but might extend within said plane in a divergent manner, and the facets 86a-d only cause an additional divergence within the other transverse plane, i.e. they are all inclined in parallel with the line extension direction and are mutually inclined in a manner that differs only with regard to the aforementioned common plane of the optical axes 102a-d; in turn, several facets 86a-d might exhibit the same inclination or be commonly associated with a group of channels whose optical axes differ, for example, already in the aforementioned common plane of the optical axes, in pairs prior to or without any beam deflection.

If the beam deflector 18 is omitted or if the beam deflector 18 is designed as a planar mirror or the like, the overall divergence might also be accomplished by the lateral offset between the optical centers of the optics 22a-d, on the one hand, and centers of the image sensor areas 28a-d, on the other hand, or by prism structures or decentered lens sections.

The aforementioned pre-divergence which may possibly exist may be achieved, for example, by placing the optical centers of optics 22a-d on a straight line along the line extension direction, while the centers of image sensor areas 28a-d are arranged to deviate from the projection of the optical centers along the normal of the plane of image sensor areas 28a-d on points on a straight line within the image sensor plane, such as at points which deviate from the points on the aforementioned straight line within the image sensor plane in a channel-specific manner along the line extension direction and/or along the direction perpendicular to both the line extension direction and the image sensor normal. Alternatively, pre-divergence can be achieved by placing the centers of the image sensors 28a-d on a straight line along the line extension direction, while the centers of the optics 22a-d are arranged to deviate from the projection of the optical centers of the image sensors along the normal of the plane of the optical centers of the optics 22a-d on points on a straight line within the optical center plane, such as at points which deviate from the points on the above-mentioned straight line in the optical center plane in a channel-specific manner along the line extension direction and/or along the direction perpendicular to both the line extension direction and the normal of the optical center plane.

It is advantageous if the above-mentioned channel-specific deviation from the respective projection occurs only in the line extension direction, i.e. if the optical axes 102a-d are located only within one common plane and are provided with a pre-divergence. Both optical centers and image sensor area centers will then lie on a straight line parallel to the line extension direction, but with different intermediate distances. A lateral offset between lenses and image sensors in a direction that is vertical and lateral to the line extension direction, on the other hand, led to an increase in the installation height. A purely in-plane offset in the line extension direction does not change the installation height, but it may possibly result in fewer facets, and/or the facets may only have a tilt in an angular orientation, which simplifies the architecture.

Although some aspects have been described in connection with a device, it is understood that these aspects also represent a description of the corresponding method, so that a block or component of a device is also to be understood as a corresponding method step or as a feature of a method step. Similarly, aspects described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device comprising:
a multi-aperture imaging device including:
  an image sensor;
  an array of adjacently arranged optical channels, each optical channel having optics for projecting at least a partial field of view of a total field of view on an image sensor area of the image sensor; and
  a beam deflector for deflecting a beam path of the adjacently arranged optical channels, wherein a relative location of the beam deflector is switchable between a first position and a second position, so that in the first position the beam path is deflected towards a first total field of view, and in the second position the beam path is deflected towards a second total field of view;
the device further comprising:
  a controller adapted to control the beam deflector to move to the first position to acquire first imaging information of the first total field of view from the image sensor to control the beam deflector to move to the second position to acquire second imaging information of the second total field of view from the image sensor, and to insert a portion of the first imaging information into the second imaging information so as to acquire accumulated image information that in parts represents the first total field of view and in parts represents the second total field of view,
  wherein the controller is adapted to create for the second imaging information a depth map comprising a plurality of depth planes and to insert the first imaging information in a predetermined depth plane of the second imaging information so as to acquire the accumulated image information, and wherein the predetermined depth plane corresponds, within a tolerance range of 10%, to a distance of the first total field of view from the device.

2. The device as claimed in claim 1, wherein the first total field of view is arranged along a user device or along an oppositely arranged world direction of the device.

3. The device as claimed in claim 2, wherein the second total field of view is arranged along a direction opposite to the first total field of view.

4. The device as claimed in claim 1, wherein the controller is adapted to identify and segment a person in the first imaging information and to insert an image of the person into the second imaging information so as to acquire the accumulated image information.

5. The device as claimed in claim 4, wherein the controller is adapted to automatically identify the person and to automatically insert the image of the person into the second imaging information.

6. The device as claimed in claim 4, wherein the controller is adapted to identify and/or segment the portion while using the depth map generated by the device from the first imaging information.

7. The device as claimed in claim 1, wherein the predetermined depth plane is based on a user input associated with a placement of the first imaging information in the second imaging information.

8. The device as claimed in claim 1, wherein the controller is adapted to scale the first imaging information so as to acquire scaled first imaging information, and to insert the scaled first imaging information into the second imaging information so as to acquire the accumulated image information.

9. The device as claimed in claim 8, wherein the controller is adapted to determine a distance of an object imaged in the first imaging information with respect to the device and to scale the first imaging information on a basis of a comparison of the determined distance with the predetermined depth plane in the second imaging information.

10. The device as claimed in claim 1, wherein the controller is adapted to detect the first total field of view and the second total field of view within a time interval of 30 ms at the most.

11. The device as claimed in claim 1, wherein the controller is adapted to acquire the accumulated image information as a video data stream.

12. The device as claimed in claim 1, wherein the controller is adapted to acquire the accumulated image information as a single frame.

13. The device as claimed in claim 1, wherein the first imaging information comprises an image of a user and the second imaging information comprises a world view of the device, wherein the controller is configured to segment the image of the user from the first imaging information and to insert it into the world view.

14. The device as claimed in claim 13, wherein the controller is adapted to insert the image of the user into the world view in a manner that is correct in terms of depth.

15. The device as claimed in claim 10, wherein the controller is adapted to detect a sequence of images of the first total field of view and/or of the second total field of view with different focal positions, and to create the depth map for the first total field of view and/or the second total field of view from the sequence of images.

16. A device comprising:
a multi-aperture imaging device including:
  an image sensor;
  an array of adjacently arranged optical channels, each optical channel having optics for projecting at least a partial field of view of a total field of view on an image sensor area of the image sensor; and
  a beam deflector for deflecting a beam path of the adjacently arranged optical channels, wherein a relative location of the beam deflector is switchable between a first position and a second position, so that in the first position the beam path is deflected towards a first total field of view, and in the second position the beam path is deflected towards a second total field of view, the device further comprising:
a controller adapted to control the beam deflector to move to the first position to acquire first imaging information of the first total field of view from the image sensor, to control the beam deflector to move to the second position to acquire second imaging information of the second total field of view from the image sensor, and to insert a portion of the first imaging information into the second imaging information so as to acquire accumulated image information that in parts represents the first total field of view and in parts represents the second total field of view,
wherein the controller is adapted to create for the second imaging information a depth map comprising a plurality of depth planes and to insert the first imaging information in a predetermined depth plane of the second imaging information so as to acquire the accumulated image information, wherein the controller is adapted to scale the first imaging information so as to acquire scaled first imaging information, and to insert the scaled first imaging information into the second imaging information so as to acquire the accumulated image information, and wherein the controller is adapted to determine a distance of an object imaged in the first imaging information with respect to the device and to scale the first imaging information on a basis of a comparison of the determined distance with the predetermined depth plane in the second imaging information.

17. A device comprising:
a multi-aperture imaging device including:
   an image sensor;
   an array of adjacently arranged optical channels, each optical channel having optics for projecting at least a partial field of view of a total field of view on an image sensor area of the image sensor; and
   a beam deflector for deflecting a beam path of the adjacently arranged optical channels, wherein a relative location of the beam deflector is switchable between a first position and a second position, so that in the first position the beam path is deflected towards a first total field of view, and in the second position the beam path is deflected towards a second total field of view,
the device further comprising:
a controller adapted to control the beam deflector to move to the first position to acquire first imaging information of the first total field of view from the image sensor, to control the beam deflector to move to the second position to acquire second imaging information of the second total field of view from the image sensor, and to insert a portion of the first imaging information into the second imaging information so as to acquire accumulated image information that in parts represents the first total field of view and in parts represents the second total field of view,
wherein the controller is adapted to detect the first total field of view and the second total field of view within a time interval of 30 ms at the most.

* * * * *